(12) United States Patent
Takahashi

(10) Patent No.: US 6,325,029 B1
(45) Date of Patent: Dec. 4, 2001

(54) VALVE TIMING CONTROL SYSTEM FOR INTERNAL COMBUSTION ENGINE

(75) Inventor: Tatsuhiko Takahashi, Hyogo-ken (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/722,693

(22) Filed: Nov. 28, 2000

(30) Foreign Application Priority Data

May 29, 2000 (JP) .................................................. 12-158063

(51) Int. Cl.[7] ............................... F02D 13/02; F01L 1/34
(52) U.S. Cl. ....................................... 123/90.15; 123/90.17
(58) Field of Search .............................. 123/90.15, 90.16, 123/90.17, 90.18, 90.31

(56) References Cited

U.S. PATENT DOCUMENTS 5,769,044 * 6/1998 Moriya ............................... 123/90.17
6,202,610 * 3/2001 Yoshiki et al. .................... 123/90.15
6,216,655 * 4/2001 Yoshiki et al. .................... 123/90.15

FOREIGN PATENT DOCUMENTS 6-159021 6/1994 (JP) .
9-317504 12/1997 (JP) .

* cited by examiner

*Primary Examiner*—Weilun Lo
(74) *Attorney, Agent, or Firm*—Sughrue, Mion, Zinn, Macpeak & Seas, PLLC

(57) ABSTRACT

A valve timing control system for an internal combustion engine is arranged such that a plurality of valve timing control means can be actuated without degrading or impairing the responsivity of the other valve timing control means or mechanism(s), whereby the responsivity of not only the valve timing control means actuated but also the other valve timing control means not actuated can be ensured. The valve timing control system includes first and second valve means (intake valve V1, exhaust valve V2) arranged for opening/closing an intake pipe (6) leading to a combustion chamber of an internal combustion engine (1) and an exhaust pipe (9) extending from the combustion chamber, and first and second valve timing control means (17) for causing a valve timing to change so that actually advanced positions of the first and second valve means (V1, V2) coincide with the respective target advance positions by regulating control values therefor, wherein the control value for the first valve timing control means is altered or modified in dependence on the controlling state of the second valve timing control means, for improving thereby the responsivity of the valve timing control system upon actuation of the first and second valve timing control means, respectively.

20 Claims, 15 Drawing Sheets

INTAKE-SIDE VVT POSITION

INTAKE-SIDE VVT CURRENT

EXHAUST-SIDE VVT POSITION

EXHAUST-SIDE VVT CURRENT

HYDRAULIC (OIL) PRESSURE

VALVE TIMING CONTROL SYSTEM FOR INTERNAL COMBUSTION ENGINE

BACKGROUND OF THE INVENTION

1. Field of the Invention

The present invention relates to a valve timing control system for controlling valve operation timing(s) for an intake valve and/or an exhaust valve of an internal combustion engine.

2. Description of Related Art

As the conventional valve timing control system for the internal combustion engine known heretofore, there may be mentioned a control system such as disclosed, for example, in Japanese Patent Publication No. 317504/1997. In this known valve timing control system, such an arrangement is adopted in which one of the intake valve and the exhaust valve which exhibits such valve characteristic which allows the characteristic value of the internal combustion engine to attain speedily a desired or target characteristic value is selected, whereon control is performed such that the amount of a hydraulic fluid supplied to one of actuating mechanisms which is destined for changing the characteristic of the valve selected is increased more than the amount of the hydraulic fluid supplied to the other actuating mechanism.

For better understanding of the concept underlying the present invention, description will first be made in some detail of the conventional valve timing control system for the internal combustion engine known heretofore. FIG. 18 of the accompanying drawings is a block diagram showing schematically and generally a configuration of a conventional valve characteristic (or performance) control system. As can be seen in the figure, this known valve timing control system is comprised of an intake valve M4 for opening/closing an intake pipe M3 for the intake air which pipe leads to a combustion chamber M2 defined within a cylinder of an internal combustion engine M1, an exhaust valve M7 for opening/closing an exhaust pipe M6 provided for discharging an exhaust gas resulting from the combustion of the air-fuel mixture within the combustion chamber M2 within the engine cylinder, first and second actuating mechanisms M5 and M8 adapted to be actuated under hydraulic pressure for changing valve characteristics of the intake valve M4 and the exhaust valve M7, respectively, a hydraulic fluid supply source M10 for supplying a hydraulic fluid such as oil to both the actuating mechanisms M5 and M8 by way of fluid passages M9, respectively, a hydraulic fluid flow regulating means M11 for regulating or adjusting the amount or rate of the hydraulic fluid supplied from the hydraulic fluid supply source M10 to both the actuating mechanisms M5 and M8, respectively, an engine operating state detecting means M12 for detecting the operating states of the internal combustion engine M1, a control means M13 for changing the characteristics or performances of both the intake and exhaust valves, respectively, through regulation by the hydraulic fluid flow regulating means M11 on the basis of the detected engine operation state so that the characteristic value of the internal combustion engine M1 can assume the desired or target characteristic value, wherein the control means M13 is so designed as to select on the basis of the prevailing engine operating state one of the intake valve M4 and the exhaust valve M7 which exhibits such valve characteristic which causes the characteristic value of the internal combustion engine M1 to reach more speedily the target characteristic value, while controlling simultaneously the hydraulic fluid flow regulating means M11 so that the amount of hydraulic fluid supplied to one of the actuating mechanisms (M5 or M8) which is destined for changing the valve characteristic of the selected valve is increased more than the amount of the hydraulic fluid supplied to the other actuating mechanism (M8 or M5).

At this juncture, it should be mentioned that the term "valve characteristic" used herein means at least one of a valve-open timing or a valve-close timing of the intake valve and the exhaust valve. Further, with the phrase "characteristic value of the internal combustion engine", it is contemplated to mean a quantity which changes in response to the changes of the intake valve and the exhaust valve such as, for example, output characteristic, exhaust characteristic, fuel consumption ratio, stability in the idling operation of the engine or the like.

As will be appreciated from the foregoing, in the conventional valve timing control system of the structure described above, such arrangement is adopted in which one of the intake valve and the exhaust valve which exhibits the valve characteristic which allows the characteristic value of the internal combustion engine to reach speedily a desired or target characteristic value is selected, whereon control is performed such that the amount of the hydraulic fluid supplied to one of the actuating mechanisms which is destined for changing the characteristic of the valve selected is increased more than that of the hydraulic fluid supplied to the other actuating mechanism.

The reason why such control as mentioned above is performed may be explained by the fact that in case a plurality of valve timing control systems or mechanisms are actuated with one and the same hydraulic fluid supply source, the oil or hydraulic pressure to be supplied becomes lower (i.e., amount of the hydraulic fluid or oil decreases) when compared with the case a single valve timing control system or mechanism is actuated, which thus incurs lowering or degradation of the responsivity of the valve timing control means or mechanisms. Such being the circumstances, the selected valve timing control means or mechanism is actuated with priority over the other.

Thus, although sufficient responsivity can be ensured for the valve timing control means or mechanism actuated with priority, the other valve timing control means or mechanism (s) will suffer shortage of oil supply, incurring degradation in the responsivity thereof more or less.

SUMMARY OF THE INVENTION

In the light of the state of the art described above, it is an object of the present invention to provide a valve timing control system for an internal combustion engine in which a plurality of valve timing control means or mechanisms can be actuated with priority being imparted to a given valve timing control means or mechanism without degrading or impairing the responsivity of the other valve timing control means or mechanisms, to thereby enhance the responsivity of the valve timing control system on the whole.

Another object of the present invention is to provide the valve timing control system which can be implemented inexpensively in a structure similar to that of the conventional or existing valve timing control system without need for provision of additional means for achieving the functions contemplated with the present invention.

In view of the above and other objects which will become apparent as the description proceeds, there is provided according to a general aspect of the present invention a valve timing control system for an internal combustion engine, which system includes first and second valve means arranged for opening/closing an intake pipe which leads to a combustion chamber of an internal combustion engine and/or an exhaust pipe which extends from the combustion chamber, a first valve timing control means designed for causing a valve timing to change so that an actually advanced position of at least either one of the first and second valve means coincides with a desired or target advance position by regulating a control value, and a second valve timing control means designed for causing a valve timing to change so that an actually advanced position of the other one of the first and second valve means coincides with a target advance position by regulating a control value, wherein the control value for the first valve timing control means is changed in dependence on a controlling state of the second valve timing control means for thereby improving responsivity of the valve timing control system upon actuation of the first and second valve timing control means, respectively.

Alternatively, in a mode for carrying out the present invention, the first valve timing control means may be designed for controlling a timing of an intake valve for actuation thereof, with the second valve timing control means being designed for controlling a timing of an exhaust valve for actuation thereof.

In another mode for carrying out the present invention, the first valve timing control means should preferably be designed for controlling a timing of an exhaust valve for actuation thereof, while the second valve timing control means may be designed for controlling a timing of an intake valve for actuation thereof.

In yet another preferred mode for carrying out the present invention, the control value for the first valve timing control means may be corrected in dependence on a control mode of the second valve timing control means.

In still another preferred mode for carrying out the present invention, the control mode may be one selected from a group consisting of a follow mode following the target advance position, a coincidence mode conforming with the target advance position and a forcive control mode for ensuring fail-safe.

In a further preferred mode for carrying out the present invention, a correcting value for the control value for the first valve timing control means which is in the follow mode following the target advance position,may be changed in dependence on the control mode of the second valve timing control means.

In a yet further preferred mode for carrying out the present invention, the correcting value for the first valve timing control means may be changed in dependence on whether the control mode of the second valve timing control means is in the follow mode following the target position or alternatively in the other control mode.

In a still further preferred mode for carrying out the present invention, the correcting value for the first valve timing control means may be selected to be greater in the state in which the second valve timing control means is in the follow mode following the target advance position rather than when the second valve timing control means is in the other control mode.

In a preferred mode for carrying out the present invention, a proportional-plus-derivative control (PD control) may be carried out in the follow mode for following the target advance position, and the correcting value to be changed may be a correcting value for a proportional value in the proportional-plus-derivative control (PD control).

In another preferred mode for carrying out the present invention in which the a proportional-plus-derivative control (PD control) is carried out in the follow mode for following the target advance position, the correcting value to be changed may include a correcting value for a proportional value and a correcting value for a differential (derivative) value, respectively.

In yet another preferred mode for carrying out the present invention in which the proportional-plus-derivative control (PD control) is carried out in the follow mode for following the target advance position, the correcting value to be changed may be a correcting value for a control value which is determined on the basis of the proportional value and the differential value of the proportional-plus-derivative control by taking into account the characteristics of the hydraulic pressure (oil pressure) control valves.

In still another preferred mode for carrying out the present invention in which the first valve timing control means is in the coincidence mode conforming with the target advance position, the correcting value for the control value may be changed in dependence on the control mode of the second valve timing control means.

In a further preferred mode for carrying out the present invention, the correcting value for the first valve timing control means may be changed in dependence on whether the control mode of the second valve timing control means is in the follow mode following the target position or alternatively in the other control mode.

In a yet further preferred mode for carrying out the present invention in which an integral control may be carried out in the coincidence mode conforming with the target advance position, the correcting value to be changed may be a correcting value for an integrated value in the integral control.

In a still further preferred mode for carrying out the present invention, the change of the valve timing control value for the first valve timing control means in dependence on the valve timing control state of the second valve timing control means may be validated only in the state in which oil pressure prevailing in the internal combustion engine is low.

In this conjunction, the state in which the oil pressure prevailing in the internal combustion engine is low may be indicated by the state in which rotation number (rpm) of the internal combustion engine is relatively low.

Further, the state in which the oil pressure prevailing in the internal combustion engine is low may alternatively be indicated by the state in which temperature of a lubricating oil for the internal combustion engine is relatively high.

Furthermore, the state in which the oil pressure prevailing in the internal combustion engine is low may alternatively be indicated by the state in which magnitude of actuation of the second valve timing control means is large.

In this conjunction, the state in which magnitude of actuation of the second valve timing control means is large may be indicated by the state in which deviation of the actually advanced position from the target advance position is large.

Further, the state in which magnitude of actuation of the second valve timing control means is large may be indicated by the state in which deviation of the control quantity is large when compared with that in the coincidence mode conforming with the target advance position.

In the valve timing control system described above, the first and second valve may be driven by a hydraulic fluid supplied from a common hydraulic fluid supply source.

Further, the control for the first and second valve timing control means may be realized by controlling a current supplied to solenoid or electrically type actuators disposed in place of the hydraulic actuators.

By virtue of the arrangement of the valve timing control system according to the present invention such that the first valve timing control means and the second valve timing control means are provided for making variable the valve timings for the first and second valves mounted for opening/closing the intake pipe and the exhaust pipe, respectively, by controlling the control values for these valves so that the actually advanced positions of the first and second valves coincide with the respective target advance positions, and that the control value for the first valve timing control means is altered or modified in dependence on or in consideration of the control state of the second valve timing control means, the responsivity of the valve timing control system upon actuation of both the valve timing control means can be improved, which in turn means that drivability of a motor vehicle equipped with the valve timing control system according to the present invention can be enhanced and that deterioration or degradation of the exhaust gas quality can be positively prevented, to a great advantage. Furthermore, even in the state where the intake-side variable valve timing mechanism (or exhaust-side variable valve timing mechanism) is being held substantially stationarily in the hold mode with the exhaust-side variable valve timing mechanism (or intake-side variable valve timing mechanism) being actuated, there can be realized a stable control without impairing the steady-state stability of the intake-side variable valve timing mechanism (or exhaust-side variable valve timing mechanism) which is held substantially stationarily by increasing correctively the hydraulic pressure for the relevant actuator.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
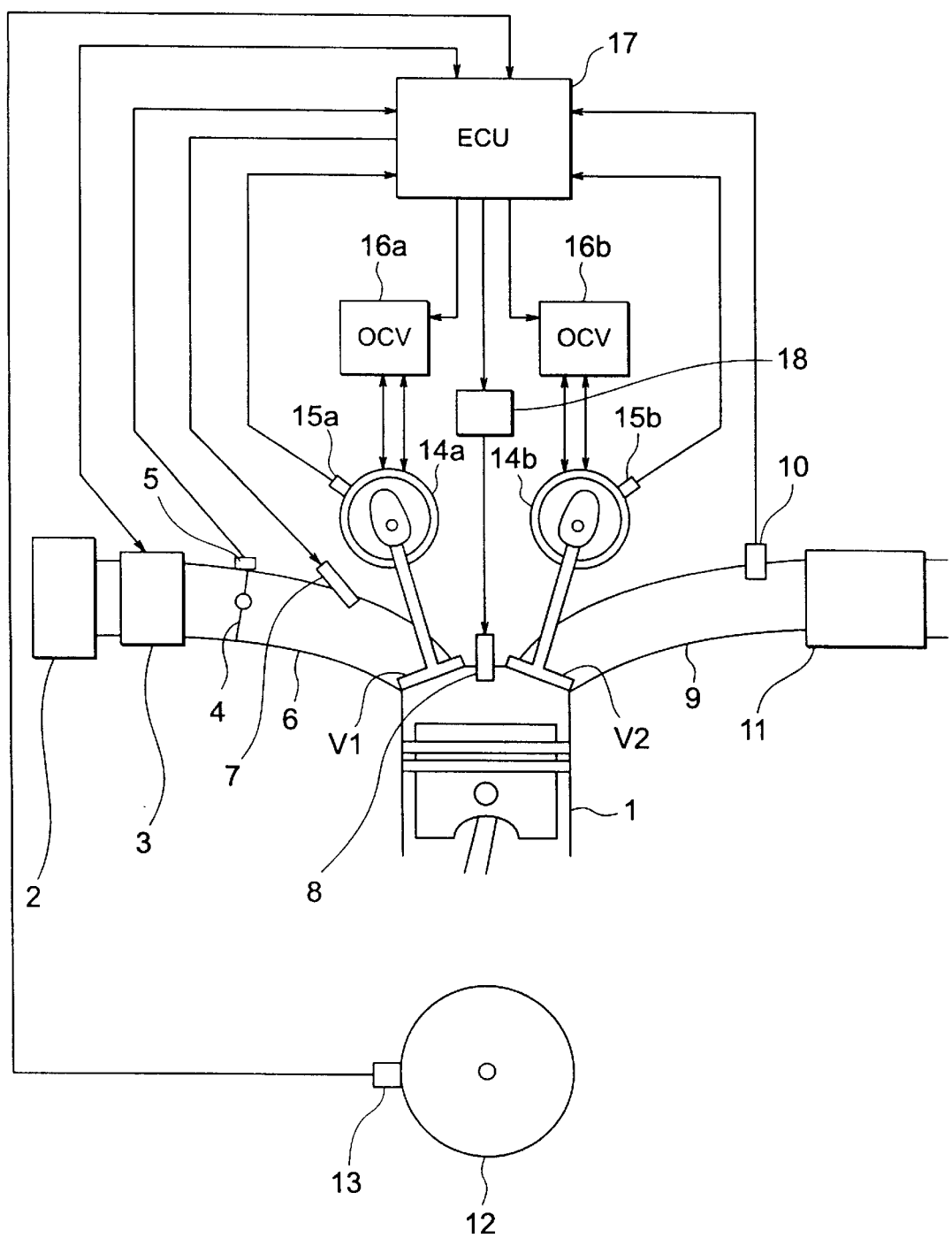
FIG. 1 is a functional block diagram showing generally a configuration of a valve timing control system for an internal combustion engine to which the concept of the present invention can find application.

The present invention will be described in detail in conjunction with what is presently considered as preferred or typical embodiments thereof by reference to the drawings. In the following description, like reference characters designate like or corresponding parts throughout the several views. Also in the following description, it is to be understood that such terms as "leftward", "rightward", "tops", "bottom", "upward", "downward" and the like are words of convenience and are not to be construed as limiting terms.

Embodiment 1

Now, description will be made of a valve timing control system for an internal combustion engine according to a first embodiment of the present invention by reference to FIG. 1 which is a functional block diagram showing generally and schematically a configuration of the valve timing control system together with some parts of the engine which the first embodiment of the invention concerns. Referring to FIG. 1, provided in association with an intake pipe 6 for feeding the air into a combustion chamber(s) defined within the cylinder (s) of an internal combustion engine (hereinafter also referred to simply as the engine in short) 1 are an air cleaner 2 for purifying the intake air, an air flow sensor 3 for measuring the quantity or flow rate of the intake air, a throttle valve 4 for adjusting or regulating the intake air quantity (i.e., amount or flow rate of the intake air) to thereby control the output of the engine 1, a throttle position sensor 5 for detecting the opening degree of the throttle valve 4, a fuel injector 7 for charging or injecting an amount of fuel which conforms with the intake air quantity, and an intake valve V1 for opening/closing an inlet port for the intake air which leads to the combustion chamber of the engine cylinder. On the other hand, provided internally of the combustion chamber of the engine cylinder 1 is a spark plug 8 for producing a spark discharge in order to trigger combustion of the air-fuel mixture charged in the combustion chamber defined within the cylinder. Further, provided in association with an exhaust pipe 9 for discharging an exhaust gas resulting from the combustion of the air-fuel mixture within the engine cylinder are an $O_2$-sensor 10 for detecting the content of residual oxygen contained in the exhaust gas, a three-way catalytic converter 11 which is capable of eliminating simultaneously harmful gas components such as HC (hydrocarbon), CO (carbon monoxide) and $NO_x$ (nitrogen oxides) contained in the exhaust gas, and an exhaust valve V2 for opening/closing an outlet port through which the exhaust gas is discharged from the combustion chamber of the engine 1.

The internal combustion engine 1 is further comprised of a crank shaft on which a disk-like sensor plate 12 is mounted corotatably therewith for detecting the crank angle. To this end, a crank angle sensor 13 is installed at a position diametrically opposite to the outer periphery of the sensor plate 12 for the purpose of detecting the angular position of the crank shaft in cooperation with the sensor plate 12. More specifically, the sensor plate 12 is formed with a radial projection in the outer periphery thereof so that the crank angle sensor 13 can generate a pulse-like crank angle signal every time the projection of the sensor plate 12 passes by the crank angle sensor 13. The internal combustion engine 1 further includes cam shafts for driving the intake valve V1 and the exhaust valve V2, respectively, wherein sensor plates 14a and 14b are mounted on the cam shafts for detecting relevant cam angles, respectively. Further, disposed in opposition to outer peripheries of the sensor plates 14a and 14b are cam angle sensors 15a and 15b, respectively, wherein each of the sensor plates 14a and 14b has a projection formed on the outer peripheral edge thereof so that the cam angle sensors 15a and 15b can generate cam angle detection signals indicative of the cam angles (i.e., angular positions of the cams) for the intake valve V1 and the exhaust valve V2, respectively, when the relevant peripheral projections of the sensor plates 14a and 14b pass by the cam angle sensors 15a and 15b, respectively. In this way, the cam angle (i.e., angular position of the cam) can be detected for each of the valves V1 and V2. With a view to controlling the positional phases of the cams by changing hydraulic pressure supplied to cam phase changing actuators (not shown) which are mounted on the crank shafts of the valves V1 and V2, respectively, there are provided oil control valves 16a and 16b. For overall control of the valve timing control system, an engine control unit (ECU in short) 17 is provided which may be constituted by a central processing unit (CPU in short), memories such as a random access memory (RAM), a read-only memory (ROM) and the like. The engine control unit (ECU) 17 is in charge of controlling the cam phases as well as overall control of operations of the internal combustion engine 1. Incidentally, reference numeral 18 denotes an ignition coil of the ignition system.

Before entering into elucidation of the valve cam-phase angle control, description will first be made generally and briefly of the control for the internal combustion engine 1. The air quantity (i.e., amount of the intake air) fed to the engine 1 is measured by means of the air flow sensor 3. The engine control unit (ECU) 17 arithmetically determines the fuel quantity which conforms to the air quantity as measured to thereby drive or actuate the fuel injector 7. At the same time, the engine control unit (ECU) 17 controls the time duration for electrical energization of the ignition coil 18 as well as the timing for interruption thereof for thereby producing the spark discharge at the spark plug 8 for firing the air-fuel mixture charged within the combustion chamber defined within the engine cylinder at a proper and correct timing. The amount of suction or intake air can be adjusted by means of the throttle valve 4, whereby the output torque or power generated by the internal combustion engine 1 can correspondingly be controlled. The exhaust gas resulting from the combustion of the air-fuel mixture within the cylinder of the engine 1 is discharged through the exhaust pipe 9 with the harmful components such as hydrocarbon (HC), carbon monoxide (CO) and nitrogen oxides ($NO_x$) being purified into harmless carbon dioxide ($CO_2$) and water ($H_2O$) under the action of the three-way catalytic converter 11 disposed internally of the exhaust pipe 9. With a view to ensuring a maximum purification efficiency of the three-way catalytic converter 11, an $O_2$-sensor 10 is installed within the exhaust pipe 9 for detecting the amount of residual oxygen contained in the exhaust gas, to thereby allow the engine control unit (ECU) 17 to regulate the amount of fuel for injection through a feedback control so that the air-fuel mixture can assume the so-called stoichiometric ratio.

At this juncture, it should be mentioned that in most of the conventional internal combustion engines known heretofore, the cam shafts of the intake valve and the exhaust valve, respectively, are driven from the crank shaft by way of a timing belt, a timing chain or the like. As a consequence of this, the valve open/close timings for these valves remain constant relative to the crank angle notwithstanding of the fact that the valve timing as required should intrinsically be of variable nature. However, in recent years, there is an increasing trend of adopting a variable valve timing system (also referred to as the VVT system in short) in the internal combustion engine with the aim to enhance the engine output performance while improving the quantity of the exhaust gas as well as the fuel cost or fuel consumption performance.

In the following, description will turn to operation of the variable valve timing (VVT) system. In the case of the internal combustion engine of the fixed valve timing type, rotation of the crank shaft is transmitted to the cam shafts through the medium of the timing belt, timing chain or the like and transmission mechanisms including pulleys, sprockets and the like coupled operatively to with the cam shafts. By contrast, in the case of the variable valve timing systems, actuators each of which is so designed as to be capable of changing the relative position between the crank shaft and the cam shaft are employed in place of the pulleys, sprockets or the like for the purpose of realizing controllability of the valve timing. In that case, the actuator may be either of hydraulic type or electromagnetic type. However, in the description which follows, it is presumed that the hydraulic type actuator is employed.

Figure 15:
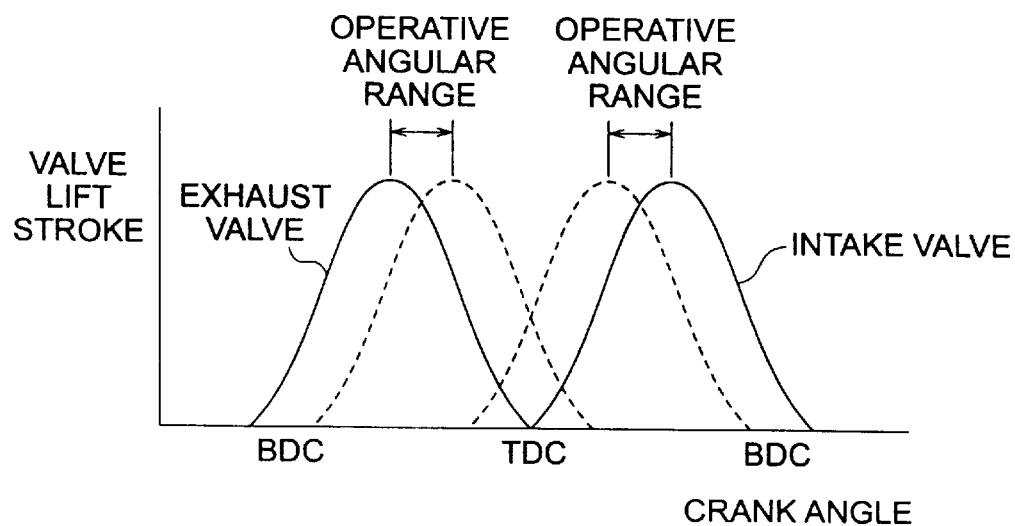
FIG. 15 is a view for illustrating ranges in which valve timings for an intake valve and an exhaust valve, respectively, can be varied in the valve timing control system according to the embodiments of the present invention.

Reference is made to FIG. 15. In the variable valve timing (VVT) system, the valve timing for each of the intake valve and the exhaust valve is variable between a position indicated by a solid line curve and a position indicated by a broken line curve, as is illustrated in FIG. 15. More specifically, the solid line curve for the intake valve represents a most retarded position at which the intake valve can stop with a minimum valve overlap, whereas the solid line curve for the exhaust valve represents a most advanced position at which the exhaust valve can mechanically be stopped with a minimum overlap. In this conjunction, advancing of the valve timing means that the valve timing is shifted to the left as viewed in FIG. 15, whereas retarding of the valve timing is equivalent to rightward displacement as viewed in FIG. 15. As can be appreciated from the above, in the variable valve timing (VVT) system, the valves can be controlled to any given position within the range defined between the solid line curve and the broken line curve.

The actuator for changing the valve timing as mentioned above is generally driven hydraulically by making use of pressure of the oil which is employed for lubrication of the internal combustion engine 1. More specifically, the valve timing can be controlled by regulating or controlling the flow of oil fed to the hydraulic actuators by means of the oil control valves 16a; 16b.

Turning back to FIG. 1, every time the projection of the sensor plate 12 installed for detecting the crank angle passes by the crank angle sensor 13, the latter generates an electric signal. Similarly, every time the projection of the sensor plate 14a; 14b mounted for detecting the cam angle (i.e., angular position of the cam) passes by the associated cam angle sensor 15a; 15b, the latter equally outputs an electric signal. On the basis of these output signals generated by the crank angle sensor 13 and the cam angle sensors 15a; 15b, the engine control unit (ECU) 17 can detect the cam angle relative to the crank angle, i.e., the actual valve timing, as an actual advance quantity.

Further, the engine control unit (ECU) 17 is so designed as to arithmetically determine as a desired or target advance quantity the valve timing which can satisfy or realize the desired exhaust gas performance, desired output performance and other desired performance of the internal combustion engine 1 under the operating conditions thereof. To this end, the desired or target advance quantity map data may be stored previously, for example, in a read-only memory or ROM incorporated in the engine control unit 17 in the form of a two-dimensional map data with the rotation number and the charging efficiency of the engine being used as parameters so that the target advance quantity can be determined by referencing the above-mentioned map by using these parameters as the indexes for referencing.

Again referring to FIG. 15, the actual advance quantities of the intake and exhaust valves are set to zero at the positions where the intake and exhaust valves are caused to mechanically stop on the intake/exhaust valve timing curves (solid line curves), respectively. Similarly, the desired or target advance quantities are set to zero at the positions on the valve timing curves (solid line curves) at which the intake and exhaust valves are to stop mechanically, respectively.

The control of the advance quantity such that the actual advance quantity can coincide with the desired or target advance quantity is performed by means of the oil control valves 16a; 16b by changing the supply of the hydraulic or oil pressure to the actuators for changing correspondingly the valve timing. In this manner, control of the advance quantity can be realized. To say in another way, the intake valve timing is so controlled as to advance relative to or form the most retarded position, while the exhaust valve timing is controlled to retard relative to or from the most advanced position.

Figure 2:
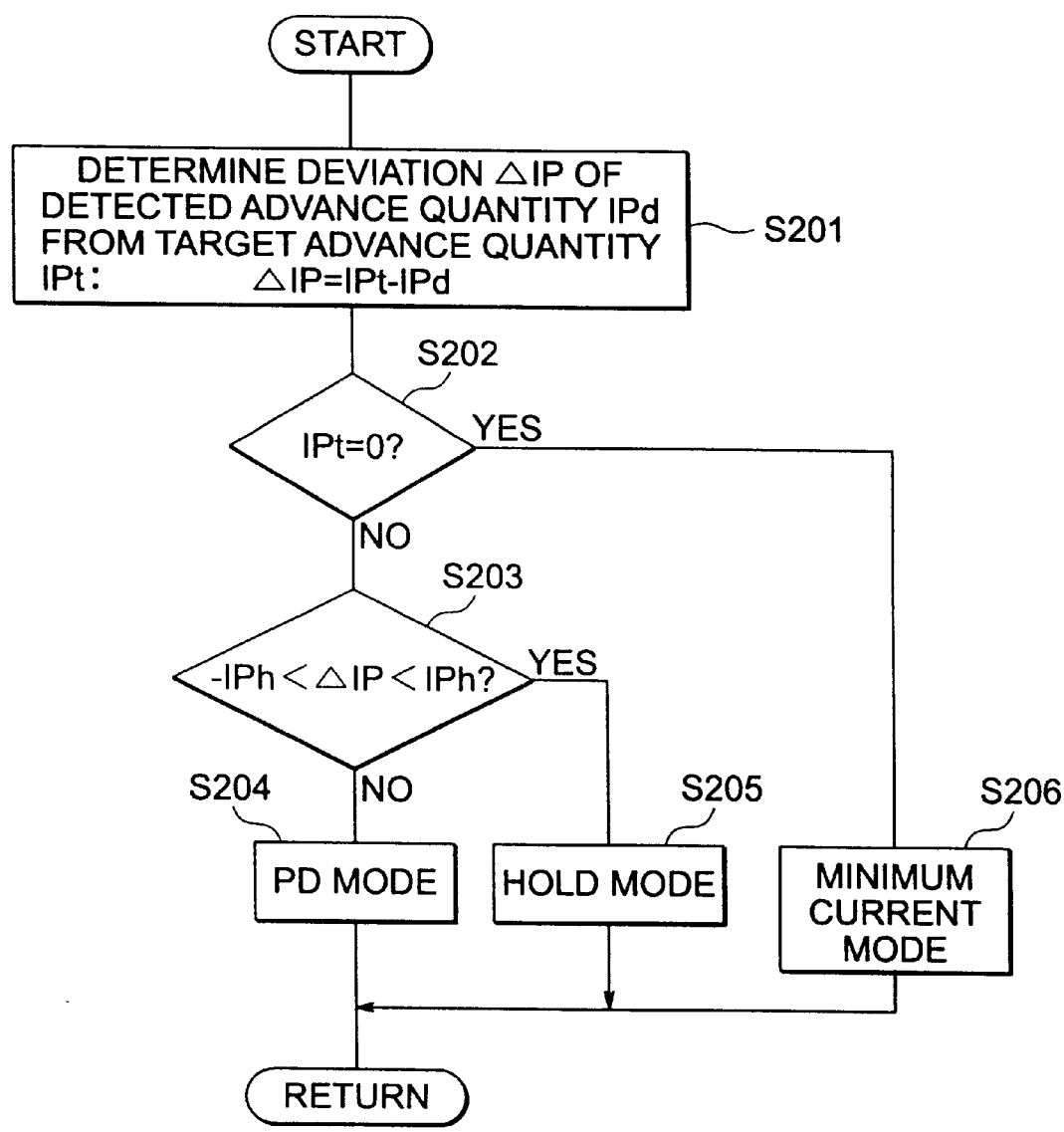
FIG. 2 is a flow chart for illustrating a processing procedure for making decision as to control mode of the variable valve timing system according to a first embodiment of the present invention.
Figure 3:
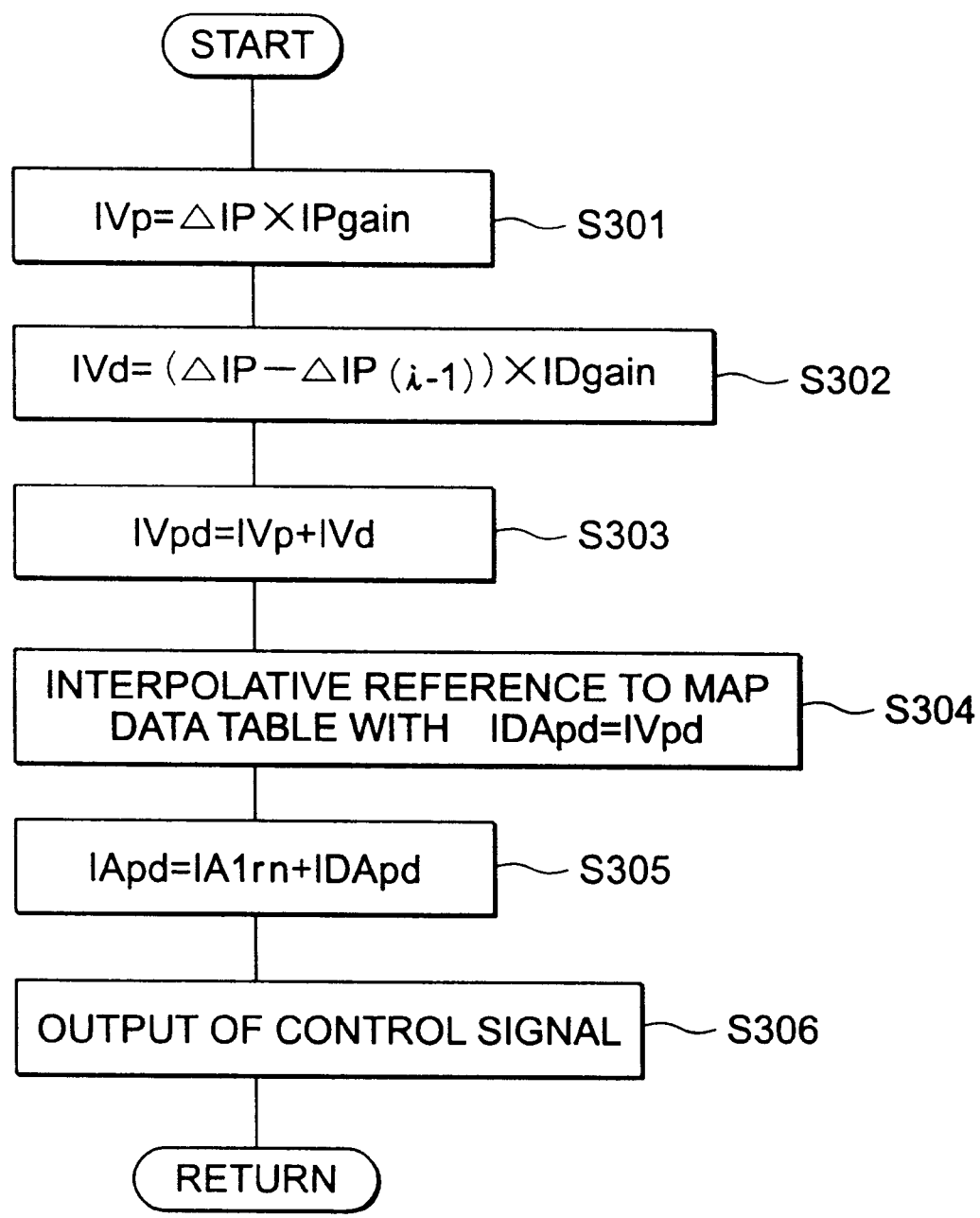
FIG. 3 is a flow chart for illustrating a control procedure executed by the valve timing control system according to the first embodiment of the invention in the case where the control mode decision shown in FIG. 2 results in a proportional-plus-derivative control mode.
Figure 7:
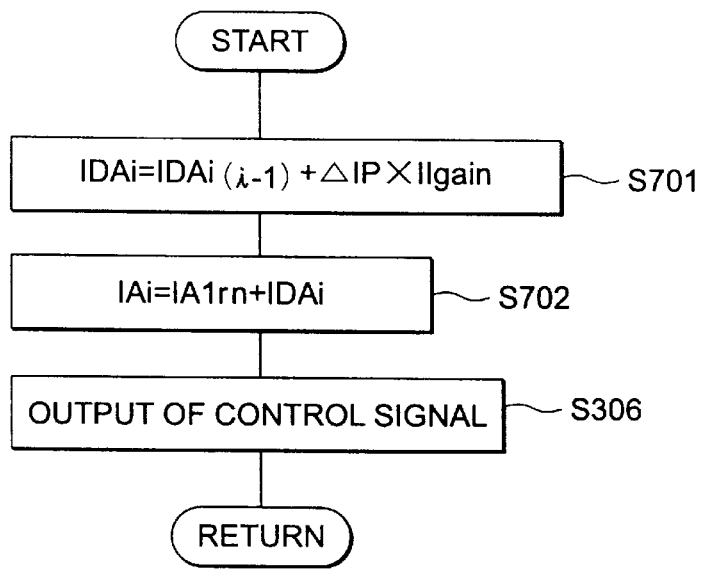
FIG. 7 is a flow chart for illustrating a control procedure which is executed by the valve timing control system according to the second embodiment of the present invention in the case where the control mode decision procedure shown in FIG. 2 results in that the control mode concerned is a hold mode indicative of coincidence with a target.

Next, referring to FIG. 2, FIG. 3 and FIG. 7, description will be made of ordinary control of the variable valve timing (VVT) system by taking as example the control of the variable valve timing mechanism for the intake valve V1, being understood that substantially same applies to the control of the exhaust valve V2. Processings illustrated in the flow charts of FIG. 2, FIG. 3 and FIG. 7 may be stored in the form of a program or programs in the ROM incorporated in the engine control unit (ECU) 17 to be executed periodically at a predetermine time interval. In more concrete, FIG. 2 is a flow chart for illustrating a processing procedure for making decision as to the control mode of the variable valve timing (VVT) system. FIG. 3 is a flow chart for illustrating contents of the processing executed in the case where the control mode decision processing (FIG. 2) results in a proportional-plus-derivative control mode (PD mode in short) which represents a mode for tracing or following the desired or target position. FIG. 7 is a flow chart for illustrating contents of the processing executed when the control mode decision (FIG. 2) processing results in that the current control mode is a hold mode indicative of coincidence or conformance with the target position.

Description will firstly be made of the control mode decision processing illustrated in FIG. 2. In a step S201, a deviation or difference ΔIP between the target advance quantity (given in terms of angle) IPt and a detected advance quantity (angle) IPd is arithmetically determined. In succession, it is decided in a step S202 whether the target advance quantity IPt is "0" (zero). When the target advance quantity (angle) IPt is zero, i.e., when the decision step S202 results in affirmation "YES", the processing proceeds to a step S206, whereon decision is made that the current control mode is a minimum current mode in which the intake valve is so controlled as to assume the most retarded position (the most advanced position in case of the exhaust valve) where the control current for the oil control valve 16a is minimum with the valve overlap being smallest.

By contrast, when it is decided in the step S202 that the target advance quantity (given in terms of angle) IPt exceeds "0" (zero), the processing proceeds to a step S203 where it is decided whether or not the deviation or difference ΔIP mentioned previously lies within a predetermined value range of –IPh to IPh. When the difference ΔIP lies within the predetermined range, this means that the target advance quantity IPt coincides substantially with the detected advance quantity IPd. Consequently, it is decided that the current mode is to be a hold mode for holding the state described above.

On the other hand, in case the difference ΔIP is decided as not falling within the predetermined value range of –IPh to IPh in the step S203, this means that the detected advance quantity IPd does not follow the target advance quantity IPt. Accordingly, it is decided that the current control mode is to be the proportional-plus-derivative mode in which the control is so performed that the detected advance quantity is caused to follow the target advance quantity IPt. When the mode decision processing described above has been completed, the processings illustrated in FIG. 2 come to an end. Parenthetically, the value IPh defining the predetermined decision range described above in conjunction with the step S203 may be one degree (1°) or so in terms of the crank angle (or CA in abbreviation) which exerts substantially no adverse influence onto the drivability, the exhaust gas quality and others even when the valve timing should vary.

When it is decided through the processing procedure illustrated in FIG. 2 that the current control mode is the proportional-plus-derivative control mode, the proportional-plus-derivative control illustrated in FIG. 3 is carried out in order to allow the detected advance quantity IPd to follow the target advance quantity IPt.

Referring to FIG. 3, at first, deviation or difference ΔIP between the detected advance quantity IPd and the target advance quantity IPt is multiplied by a proportional gain (IPgain) in a step S301 to thereby arithmetically determine a proportional value IVp. At this juncture, it should be mentioned that the proportional gain mentioned above represents a value which is so set or selected that the detected advance quantity can follow the target advance quantity with high responsivity. In practical applications, the value of the proportional gain may be set determined empirically or experimentally by checking the responsivity or responsiveness in the state where the engine 1 is actually being operated or by resorting to other appropriate method. The value of the proportional gain as determined is then stored in the ROM (read-only memory) incorporated in the engine control unit 17.

Next, in a step S302, the difference between the deviation ΔIP and a preceding value thereof ΔIP[i−1] is multiplied by the differential gain IDgain to thereby arithmetically determine a differential or derivative value IVd. Parenthetically, the preceding value of deviation (hereinafter also referred to as the preceding deviation value) ΔIP[i−1] represents the difference or deviation ΔIP which has been determined arithmetically in the course of the preceding routine of the processing now concerned which is executed periodically at a predetermined time interval. The differential gain can be set similarly to the proportional gain described above to be subsequently stored in the ROM incorporated in the engine control unit (ECU) 17.

Figure 16:
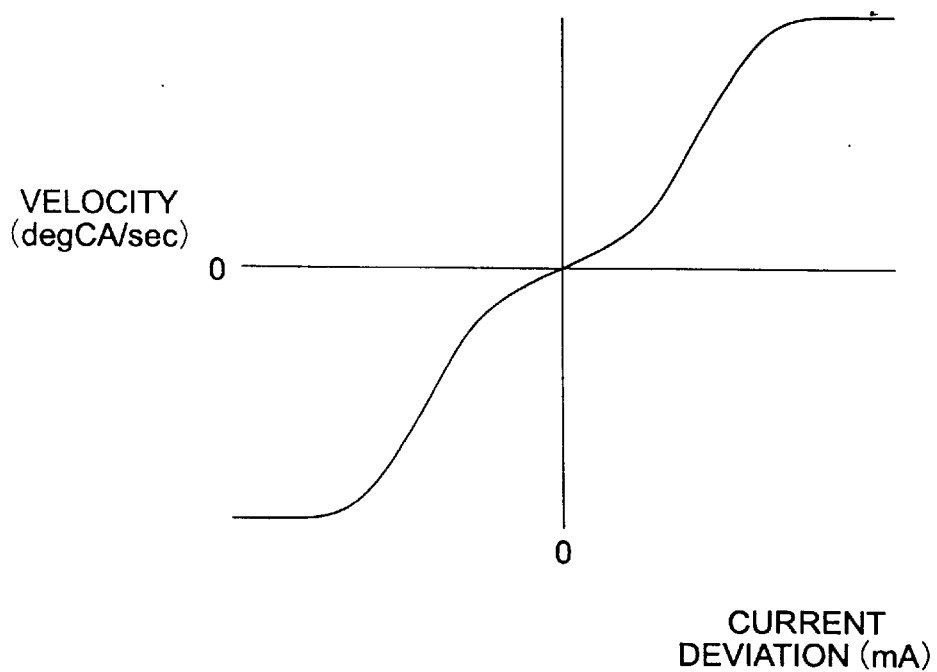
FIG. 16 is a view for illustrating graphically velocity-versus-current deviation characteristics which can be referenced for performing the control in the valve timing control system according to an embodiment of the present invention.
Figure 17:
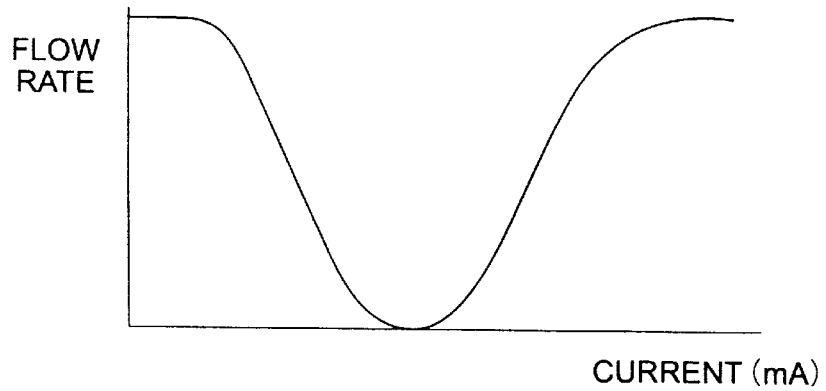
FIG. 17 is a view for illustrating graphically flow characteristics of an oil control valve which can be referenced for performing the control in the valve timing control system according to an embodiment of the present invention.
Figure 18:
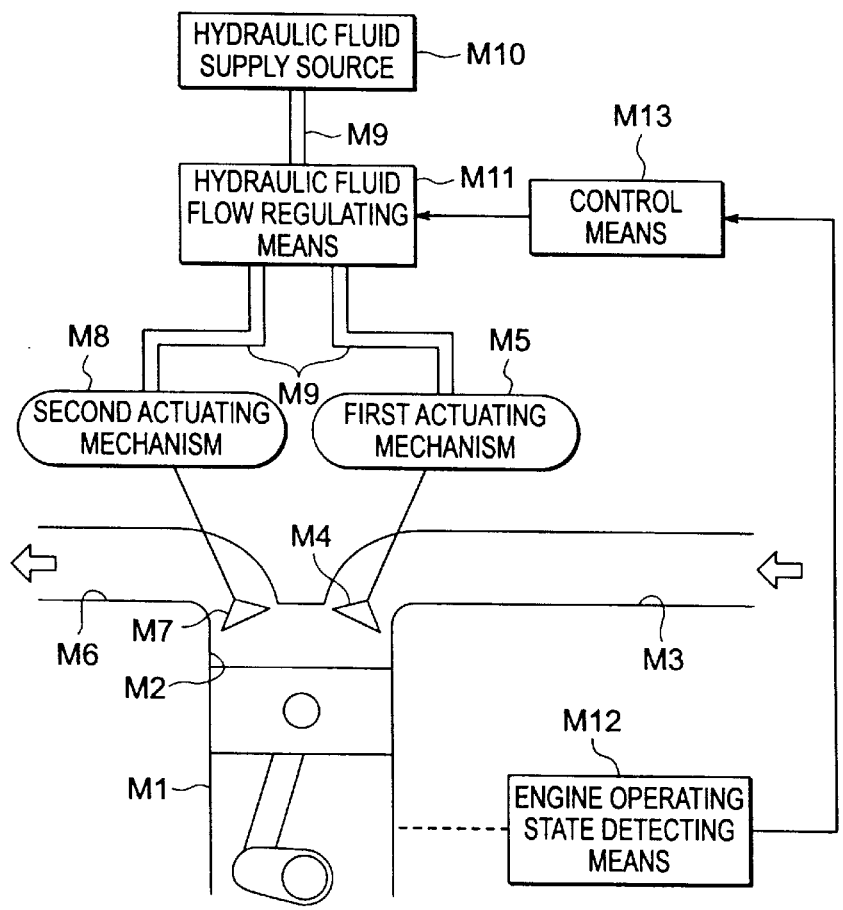
FIG. 18 is a schematic diagram showing a conventional valve characteristic control system for an internal combustion engine known heretofore.

In succession, in a step S303, the proportional value IVp and the differential value IVd are added together to thereby determine a proportional-plus-derivative value IVpd. In succession, in a step S304, a control current deviation IDApd in mA is arithmetically determined on the basis of the proportional-plus-derivative value IVpd by referencing complementarily a relevant data table which is stored in the ROM and in which data such as illustrated graphically in FIG. 16 are contained. More specifically, the table values indicated graphically in terms of velocity-versus-current deviation characteristics as illustrated in FIG. 16 represents the characteristic data of the oil control valve 16a. These characteristic values can be obtained experimentally by measuring the angular velocity of the crank shaft at individual current values in the state where a spool type solenoid valve having flow-rate characteristics such as illustrated graphically in FIG. 17 is installed in the engine 1.

Subsequently, in a step S305, a learned value IAlrn of the holding current acquired in the state where the detected advance quantity coincides with the target advance quantity in the hold control mode and the control current deviation value IDApd are added together to thereby determine a final or ultimate control current value IApd. At this juncture, it should be mentioned that the current value in the state where the target advance quantity coincides with the detected advance quantity may vary because of dispersion of parts or for other reasons. Accordingly, by learning the current value as the learned value of the holding current, influence of such dispersion to the control responsivity can be suppressed. Parenthetically, the data illustrated graphically in FIG. 16 are determined on the presumption that the position at which the target advance quantity coincides with the detected advance quantity is set to be zero, as mentioned previously.

In succession, in a step S306, the control current value IApd is converted into a duty value the signal of which is then supplied to the oil control valve 16a.

Now, it is assumed that the control mode is decided as the hold mode through the processing routine shown in FIG. 2. In that case, processing for causing the detected advance quantity to follow the target advance quantity with higher accuracy is carried out by resorting to an integral control for changing finely or minutely the control current value.

FIG. 7 is a flow chart for illustrating a control procedure executed in the hold mode. When it is decided in the processing step S205 shown in FIG. 2 that the control mode now concerned is the hold mode (step S205), the hold mode now concerned is carried out.

Referring to FIG. 7, the deviation or difference ΔIP between the detected advance quantity and the target advance quantity is multiplied by an integration gain IIgain in a step S701, and then the resulting product is added to the preceding integrated value IDAi[i−1] to thereby arithmetically determine an integrated value IDAi. Parenthetically, the integration gain is a preset value similarly to the proportional gain and the differential gain. Incidentally, the preceding value mentioned above represents the integral value which has been determined arithmetically in the course of executing the processing procedure shown in FIG. 7 periodically at a predetermined time interval.

In succession, in a step S702, the integrated value IDAi is added to the learned holding current value IAlrn (i.e., learned value of the holding current) to determine arithmetically the control current value IAi, whereon the signal indicative of the control current value IAi is supplied to the oil control valve mechanism 16a in a step S306.

On the other hand, when the control mode of concern is decided to be the minimum current mode through the processing procedure shown in FIG. 2 (step S206), the control is performed with the minimum value of the control current for the oil control valve 16a so that the valve timing can result in the minimum valve overlap position. At this juncture, it should be mentioned that the minimum current value may be a value in the electrically non-conducting state (i.e., zero milliampere). However, it is preferred that the minimum current value be set at 100 milliampere or so at which the valve timing does not shift in the advancing direction, because then transition from the minimum current mode to the proportional-plus-derivative (PD) control mode for actuating the variable valve timing (VVT) system can be realized with enhanced responsivity.

As will now be appreciated from the foregoing description, by controlling the output current value for the intake valve by changing over the control procedure in dependence on the control mode decided through the decision procedure shown in FIG. 2, the control accuracy can be enhanced. Although the foregoing description has been directed only to the intake valve mechanism. In this conjunction, it should however be noted that the present invention is concerned with the control for a plurality of valve timing changing mechanisms for both the intake valves and the exhaust valves, as can be seen from FIG. 1. Accordingly, essentially same control as described above is also performed for the exhaust valve mechanism as well. In this conjunction, it should be pointed out that when the valve control is performed simultaneously for both the intake valve mechanism and the exhaust valve mechanism, the amount or quantity of oil required for such control will increase correspondingly, which may undesirably result in remarkable lowering of the hydraulic or oil pressure when compared with the control only for the intake valve mechanism or only for the exhaust valve mechanism. Of course, this means that the responsivity for the valve control will be degraded more or less.

In the case of the conventional intake/exhaust valve control system, the valve timing control either for the intake valve mechanism or for the exhaust valve mechanism is imparted with priority so that the control for the valve mechanism imparted with priority is carried out with enhanced responsivity. However, this method is disadvantageous in that the responsivity or responsiveness of the valve mechanism imparted with lower priority will become lowered, which is of course undesirable. Such being the circumstances, in the valve timing control system according to the instant embodiment of the present invention, consideration is paid so that even the oil control valve mechanism which has not been selected because of the lower priority can be protected against degradation in the responsivity. This method will be described below.

Figure 4:
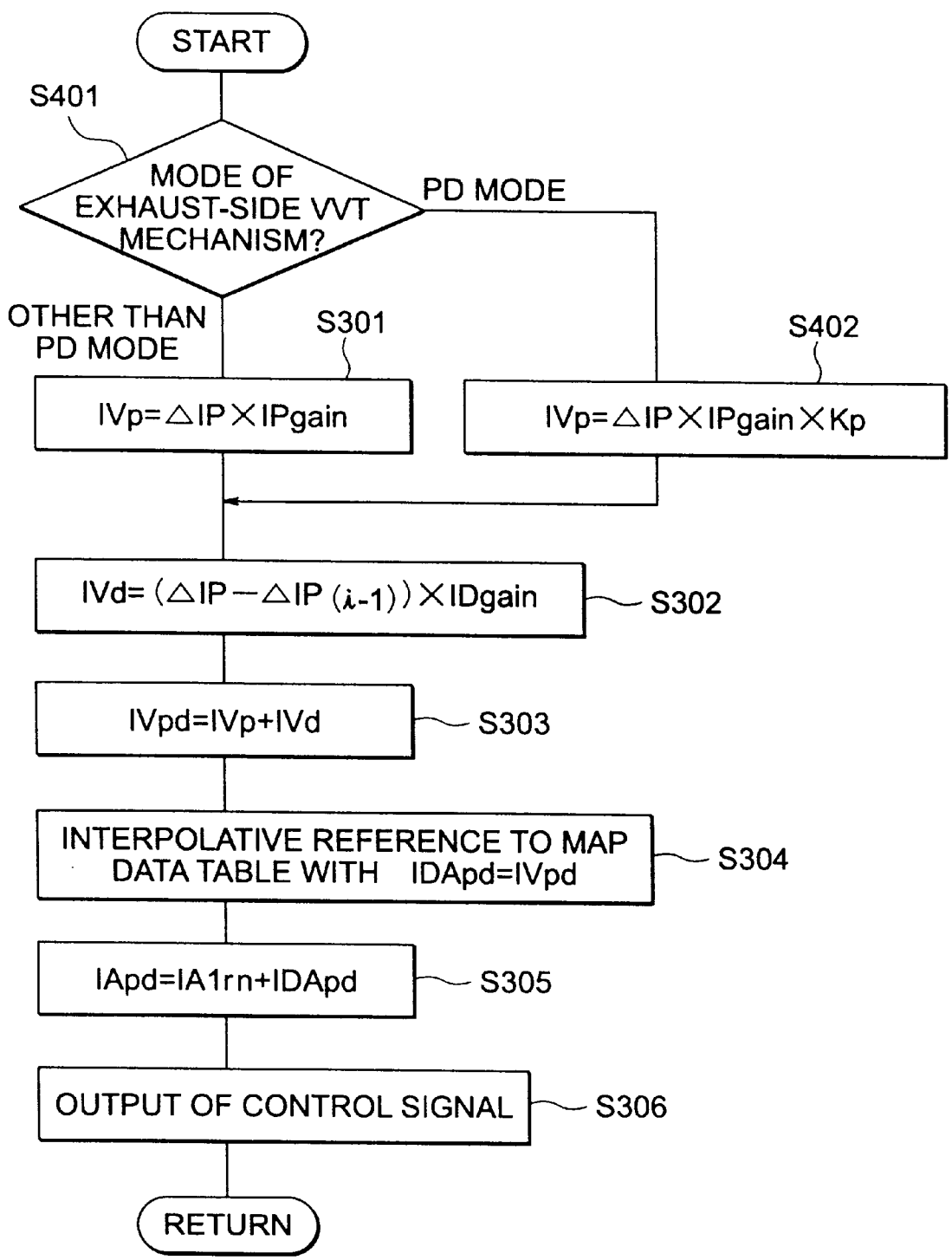
FIG. 4 is a flow chart for illustrating a control procedure executed for an exhaust valve mechanism by the valve timing control system according to the first embodiment of the invention.

FIG. 4 is a flow chart for illustrating in detail the contents of the control performed by the exhaust-side variable valve timing (VVT) mechanism according to the first embodiment of the invention. The exhaust-side variable valve timing control illustrated in FIG. 4 is executed in place of the control procedure shown in FIG. 3 which is executed when the proportional-plus-derivative control mode is decided through the decision procedure shown in FIG. 2 (see step S204). Incidentally, in FIG. 4, the processing steps similar to those shown in FIG. 3 are denoted by like reference characters and repetitional description of these steps will be omitted.

Referring to FIG. 4, it is decided at first in a step S401 in which of the control modes the exhaust-side variable valve timing mechanism is. It is supposed, for example, that the decision in the step S401 shows that the exhaust-side variable valve timing mechanism is not in the proportional-plus-derivative mode but in the minimum current mode or in the hold mode. In that case, the hydraulic or oil pressure does not lower because of the steady state at a given valve timing. Accordingly, the processing makes transition to the step S301 where the proportional value arithmetic is performed without execution of correction according to the instant embodiment of the present invention.

When it is decided in the step S401 that the exhaust-side variable valve timing mechanism is in the proportional-plus-derivative control mode, this means that the mechanism mentioned above is in the state where the intake valve and the exhaust valve are being actuated simultaneously with the necessity for oil supply to both the actuators for the intake valve and the exhaust valve. Further, the lowering of the hydraulic pressure is remarkable when compared with the state where only the intake valve is being actuated. Accordingly, the processing proceeds to a step S402 where correction (Kp) of the proportional value is performed for compensating for degradation of the responsivity due to the lowering of the hydraulic pressure by increasing the control current value for thereby enhancing the responsivity.

As will now be appreciated from the foregoing, in the valve timing control system according to the instant embodiment of the invention, decision is made as to whether or not the correction of the proportional value is to be performed in dependence on the operating state of the exhaust-side variable valve timing mechanism. More specifically, when it is decided that the exhaust-side variable valve timing mechanism is in the operating state and that the correction is thus necessary, the correction for compensating for the lowering of the responsivity brought about by the lowering of the hydraulic pressure is performed. As a result of this, the variable valve timing (VVT) system as a whole can be operated without being accompanied with lowering of the responsivity notwithstanding of the simultaneous actuation of the intake- and exhaust-side variable valve timing mechanisms which will bring about remarkable lowering of the hydraulic or oil pressure when compared with the state where only the intake-side variable valve timing mechanism is actuated, giving rise to an advantage.

Parenthetically, the same control as that illustrated in the flow chart of FIG. 4 is equally adopted in the exhaust-side variable valve timing mechanism. In more concrete, upon actuation of the intake-side variable valve timing mechanism, the correction for compensating for lowering of the hydraulic pressure (oil pressure) is performed for the exhaust-side variable valve timing mechanism as well, whereby the responsivity of the exhaust-side variable valve timing mechanism is protected against degradation similarly to the case of the intake-side variable valve timing mechanism or system. In other words, when both the intake- and the exhaust-side variable valve timing mechanisms are actuated simultaneously, the proportional values for control of both the mechanisms are corrected, whereby improvement of the responsivity of the variable valve timing system as a whole can be ensured when compared with the conventional variable valve timing (VVT) system.

Figure 5:
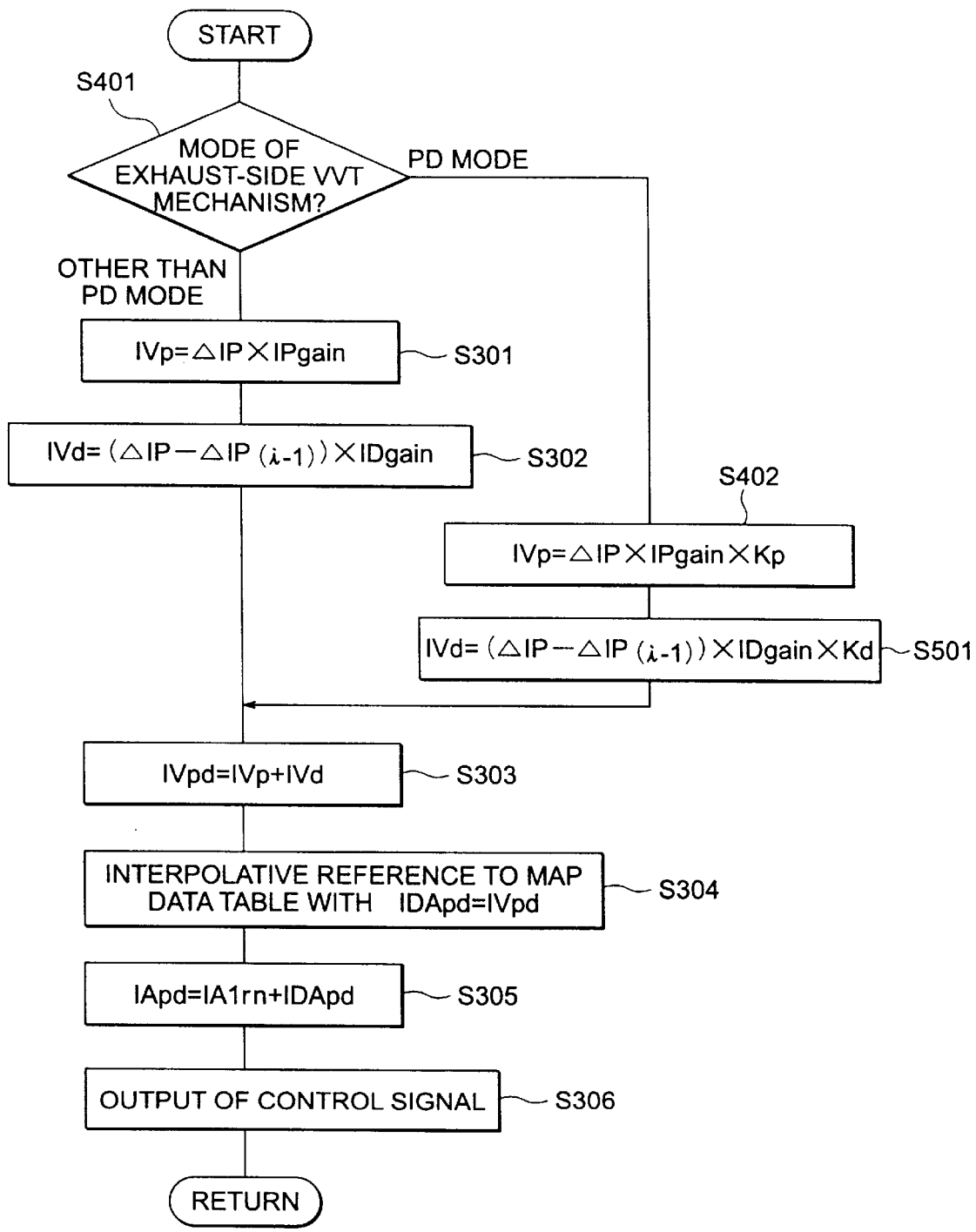
FIG. 5 is a flow chart for illustrating another control procedure executed by the valve timing control system according to the first embodiment of the invention.

Further, FIG. 5 shows a flow chart for illustrating, by way of example, another correcting method according to the instant embodiment of the present invention. In the case of the control procedure illustrated in FIG. 4, the correction is performed only for the proportional value. However, when the exhaust-side variable valve timing mechanism is in the proportional-plus-derivative control mode, requiring the correction, correction (Kp) may be performed for the proportional value IVp for compensating for lowering of the responsivity due to lowering of the hydraulic pressure in a step S402, and then correction (Kd) may be performed for the differential value IVd in order to compensate for the lowering of the responsivity in a step S501, as is shown in FIG. 5.

Figure 6:
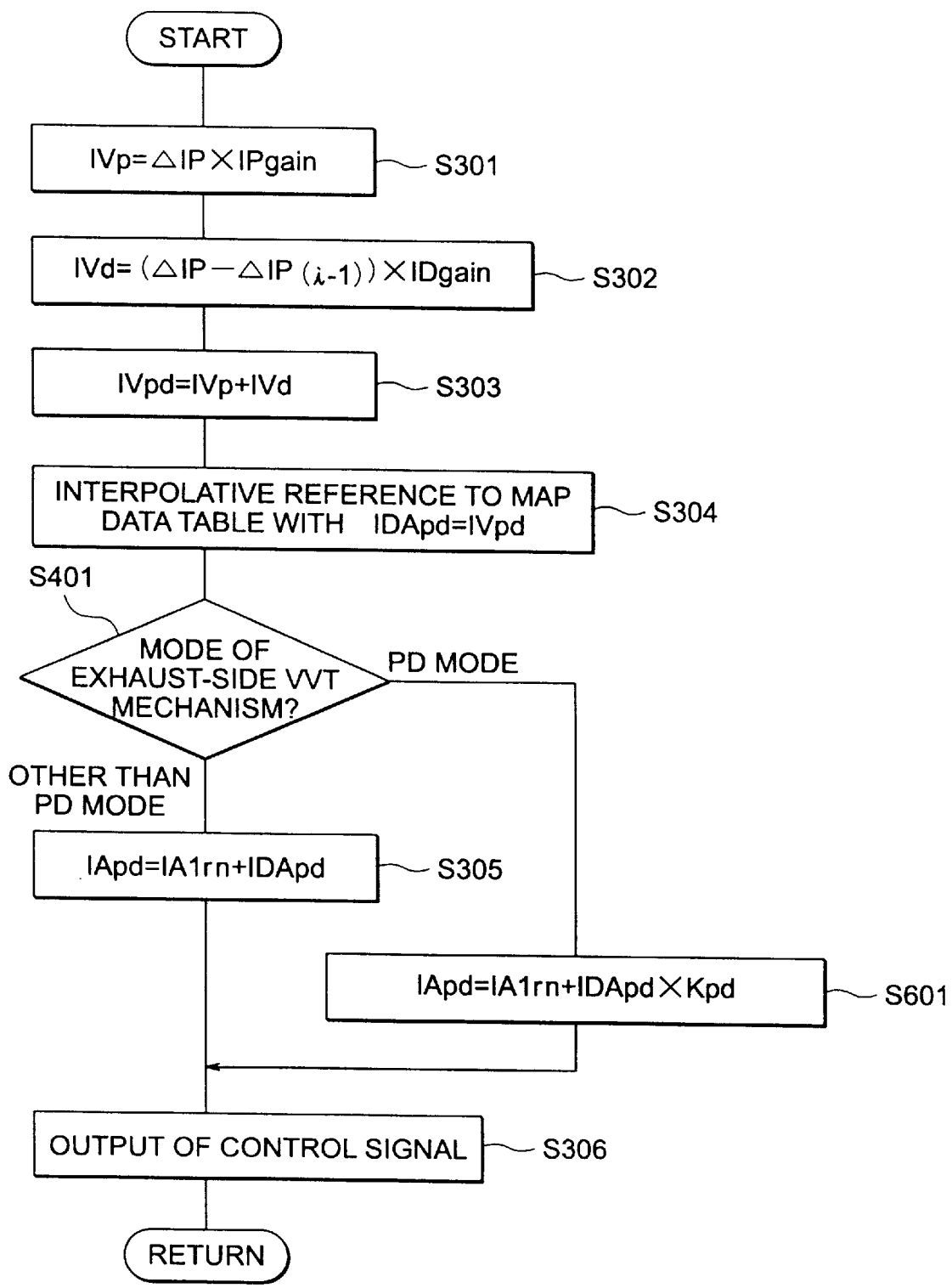
FIG. 6 is a flow chart for illustrating a control correcting method according to the first embodiment of the invention.

Furthermore, FIG. 6 is a flow chart for illustrating, by way of example, another correcting method according to the first embodiment of the present invention. In the case of the processing procedure shown in FIG. 4, the proportional value is subjected to the correction. By contrast, in the case of the correction method illustrated in FIG. 6, correction (Kpd) is performed for the control current value IApd in a step S601 instead of the correction for the proportional value. It goes without saying that similar advantageous effects can be ensured by the control procedure illustrated in FIG. 6 as well.

By setting the correcting values (Kp, Kd and Kpd) as the constants, respectively, as mentioned above, the correction can certainly be made effective. In this conjunction, it should however be added that the corrections can be realized with higher accuracy by taking into account the engine rotation number (by referencing interpolatively a two-dimensional engine rotation number-versus-correcting value map data table), the deviation or difference between the detected advance quantity and the target advance quantity (by referencing interpolatively a two-dimensional deviation-versus-correcting value map data table), and the engine rotation number and deviation (by referencing interpolatively a three-dimensional engine rotation number and deviation-versus-correcting value map data table), respectively.

Figure 13A:
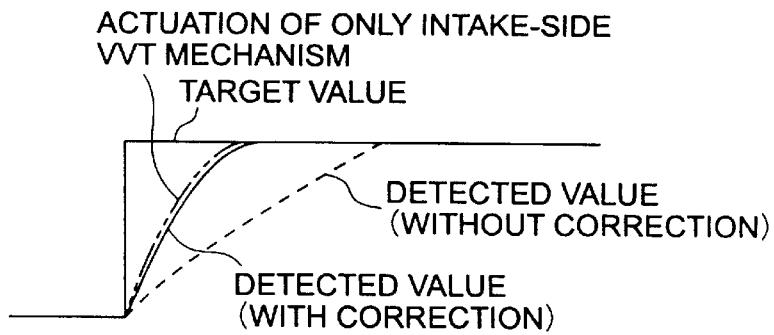
FIGS. 13A to 13E are waveform diagrams for illustrating operations of the valve timing control system according to the first embodiment of the invention.
Figure 13B:
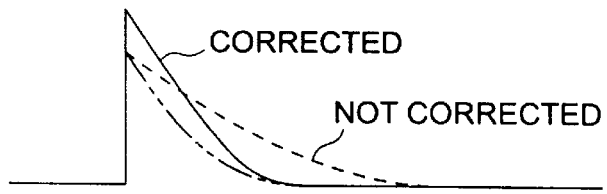
Figure 13C:
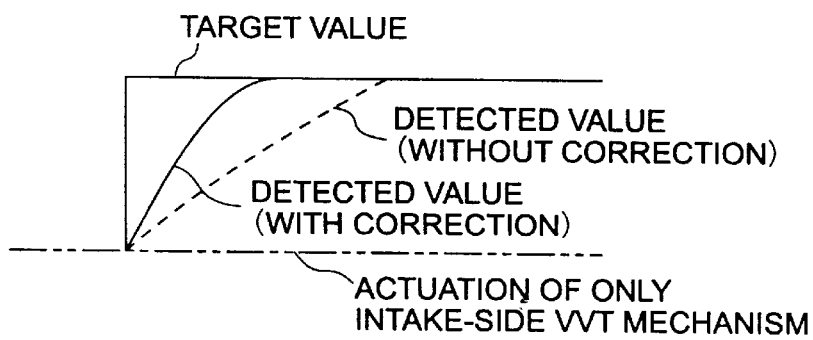
Figure 13D:
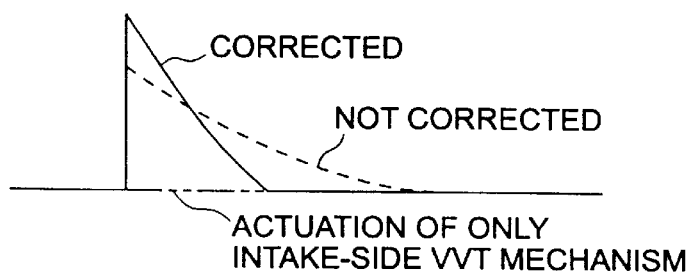
Figure 13E:
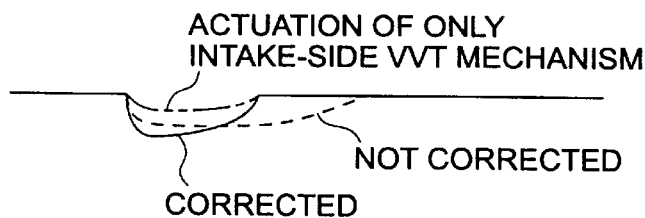

FIGS. 13A to 13E show waveform diagrams for illustrating the effects owing to the corrections described above. Referring to FIG. 13E, it can be seen that in contrast to the operation of only the intake-side variable valve timing mechanism as indicated by double-dotted broken curve, the response time is considerably extended when no correction is performed for the simultaneous operation of both the intake- and exhaust-side variable valve timing mechanisms (as indicated by a broken line curve) because of remarkable lowering of the hydraulic or oil pressure. On the other hand, when the corrections taught by the present invention are performed as indicated by a solid line curve, the response time can be improved or shortened by compensating for degradation of the responsivity due to lowering of the hydraulic pressure by increasing supplementarily the current for the oil control valve of the intake-side variable valve timing mechanism. Furthermore, correction is also performed for the exhaust-side variable valve timing mechanism because the intake-side variable valve timing mechanism is being actuated, whereby the responsivity of the exhaust-side variable valve timing (VVT) mechanism is protected against the lowering, similarly to the intake-side variable valve timing mechanism.

Embodiment 2

In the case of the valve timing control system according to the first embodiment of the present invention, description concerning the processings has been made on the presumption that the intake-side variable valve timing mechanism is in the proportional-plus-derivative control mode for causing the detected advance quantity IPd to follow or trace the target advance quantity IPt. In the state where the exhaust-side variable valve timing mechanism is being actuated, the hydraulic pressure becomes lower. Consequently, even in the case where the intake-side variable valve timing mechanism is in the hold mode for holding the intake valve at an intermediate position, lowering of the hydraulic pressure will naturally exert influence to the stability of the hold control, giving rise to such phenomenon that the valve timing is caused to shift in the retarding direction. The second embodiment of the present invention is directed to a method of ensuring the stability of the hold control for the variable valve timing (VVT) system in the hold mode for holding the state in which the deviation or difference ΔIP between the target advance quantity IPt and the detected advance quantity IPd lies within a predetermined range.

Figure 8:
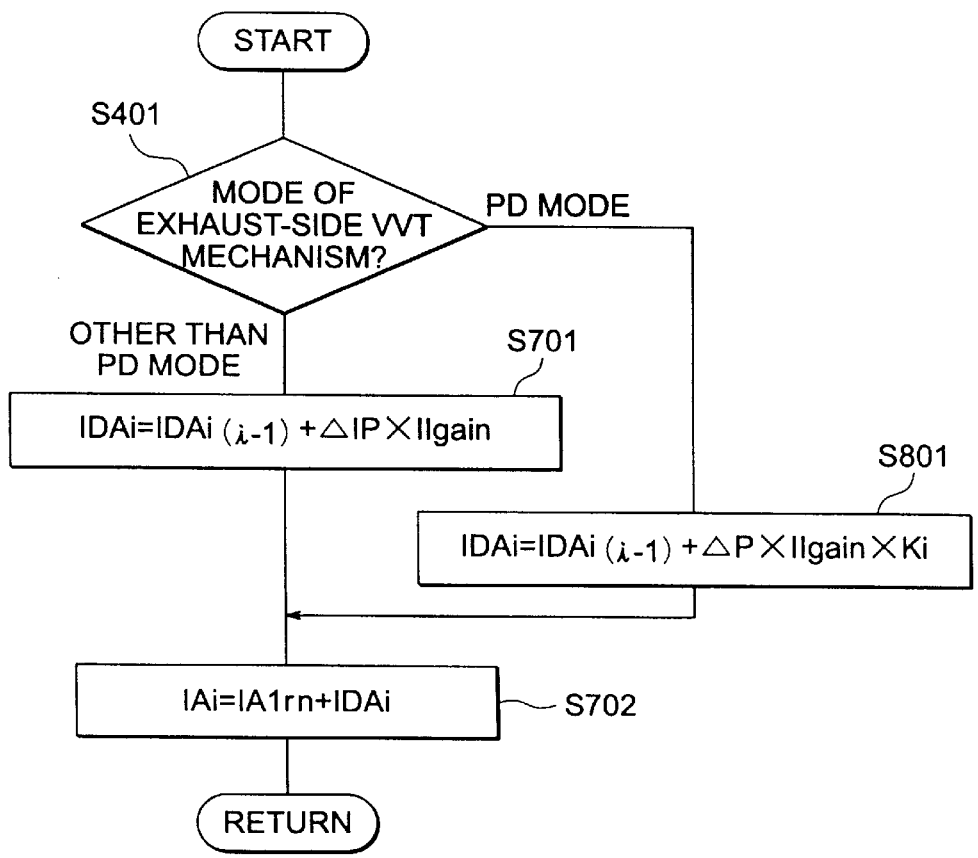
FIG. 8 is a flow chart for illustrating a control procedure executed for an intake-side variable valve timing mechanism in the hold mode by the valve timing control system according to the second embodiment of the invention.

FIG. 8 is a flow chart for illustrating the processing procedure for the hold mode of the intake-side variable valve timing (VVT) mechanism according to the second embodiment of the present invention. The intake-side variable valve timing control procedure illustrated in FIG. 8 is to replace the control procedure illustrated in FIG. 7. Now, reference is made to FIG. 8. Similarly to the control in the proportional-plus-derivative control mode of the valve timing control system according to the first embodiment of the invention, decision is made in a step S401 shown in FIG. 8 as to whether the exhaust-side variable valve timing mechanism is in the proportional-plus-derivative control mode. When the decision in the step S401 shows that the exhaust-side variable valve timing mechanism is not in the proportional-plus-derivative control mode, the processing proceeds to a step S701 where the correction through the arithmetic operation described hereinbefore is not performed but the integral value is determined. By contrast, when it is decided in the step S401 that the exhaust-side variable valve timing mechanism is in the proportional-plus-derivative control mode, this means that the exhaust-side variable valve timing mechanism is being actuated, which means that the hydraulic pressure is lowered. Accordingly, the processing makes transition to a step S801 where correction is performed for the integrated value IDAi with a correcting value Ki to thereby suppress variation of the control due to lowering of the hydraulic pressure. In this manner, positional stability can be enhanced in the valve timing control system according to the second embodiment of the present invention.

By setting the correcting value (Ki) as the constant, as mentioned above, the corrections can certainly be made effective. In this conjunction, it should however be added that the correction can be realized with higher accuracy by taking into account variables exerting influence to the hydraulic pressure such as engine rotation number (by referencing interpolatively a two-dimensional engine rotation number-versus-correcting value map data table), deviation or difference between the target advance quantity and the detected advance quantity (by referencing interpolatively a two-dimensional deviation-versus-correcting value map data table), and/or engine rotation number and deviation (by referencing interpolatively a three-dimensional engine rotation number and deviation-versus-correcting value map data table).

Figure 14:
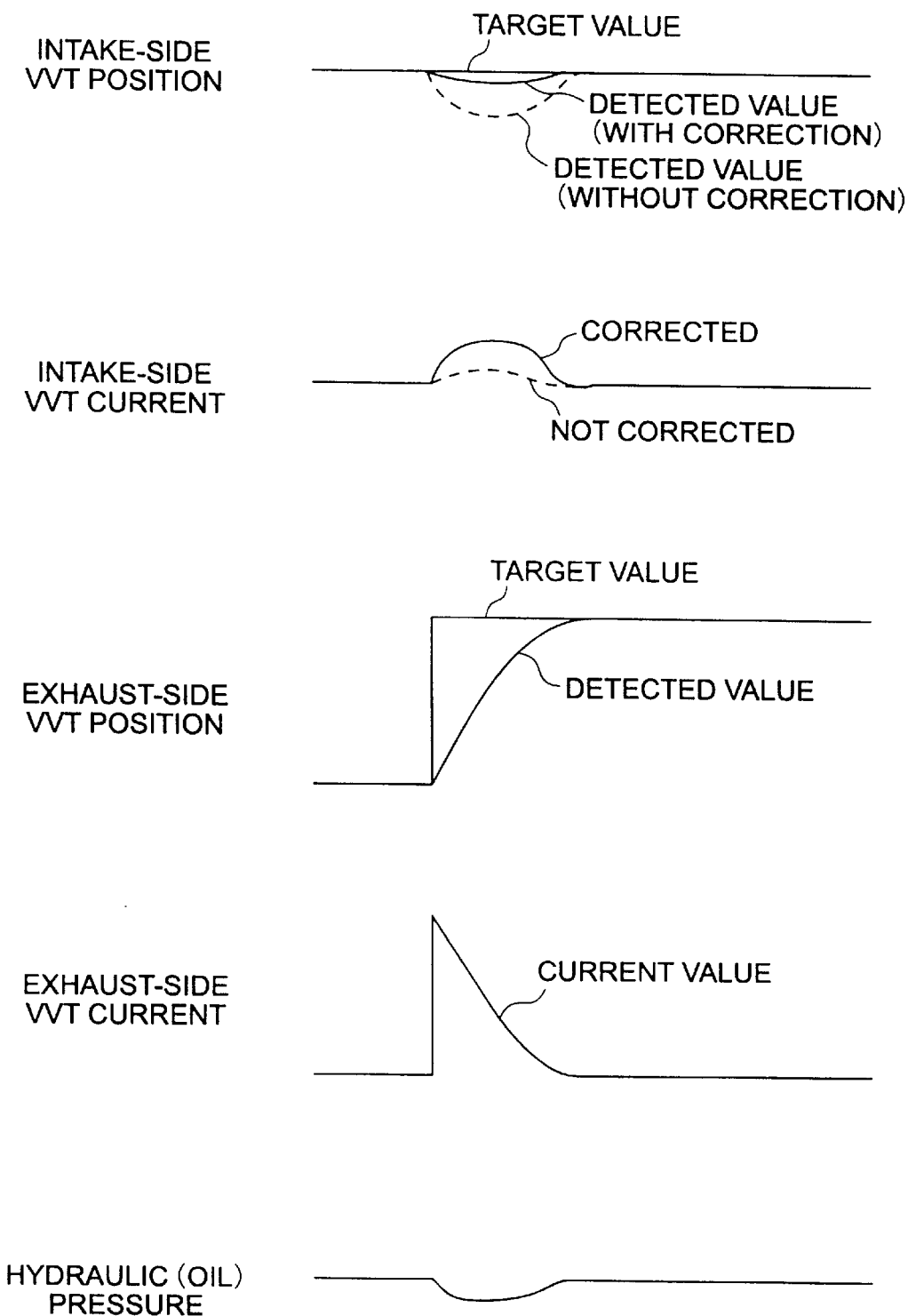
FIG. 14 is a timing chart for illustrating operations of the valve timing control system according to the second embodiment of the present invention.

FIG. 14 is a timing chart for illustrating operations of the valve timing control system according to the second embodiment of the present invention. When the hydraulic pressure varies (lowers) due to actuation of the exhaust-side variable valve timing mechanism, the steady-state stability (or stability of the steady state) of the intake-side variable valve timing mechanism is disturbed to bring about variation (degradation) (refer to broken line curve). Accordingly, in the valve timing control system according to the second embodiment of the invention, correction of the integrated value for the intake-side variable valve timing mechanism is performed to thereby allow the current supplied to the oil control valve to increase. Thus, the responsivity is improved as indicated by a solid line curve. In other words, the steady state stability can be ensured with the variation being substantially suppressed.

Embodiment 3

In the foregoing description of the valve timing control system, correction is performed over the whole operation range of the engine in which the control is performed for the variable valve timing (VVT) system. However, in the state where the hydraulic pressure of sufficient level can be assured, a sufficient amount of oil required to be supplied to the variable valve timing (VVT) actuators is available. Accordingly, lowering of the hydraulic pressure is not remarkable even upon actuation of the variable valve timing (VVT) mechanisms, incurring substantially no degradation in the responsivity. Similarly, in the case where the angle at which the variable valve timing (VVT) actuator is operated is small, lowering of the hydraulic pressure is small, allowing the responsivity to be ensured without resorting to the correction. On a contrary, the correction performed in such situation will incur overshoot in excess, to a disadvantage. Such being the circumstances, the third embodiment of the present invention is directed to a method of carrying out the correction only in the engine operation range in which the correction is really required.

Figure 9:
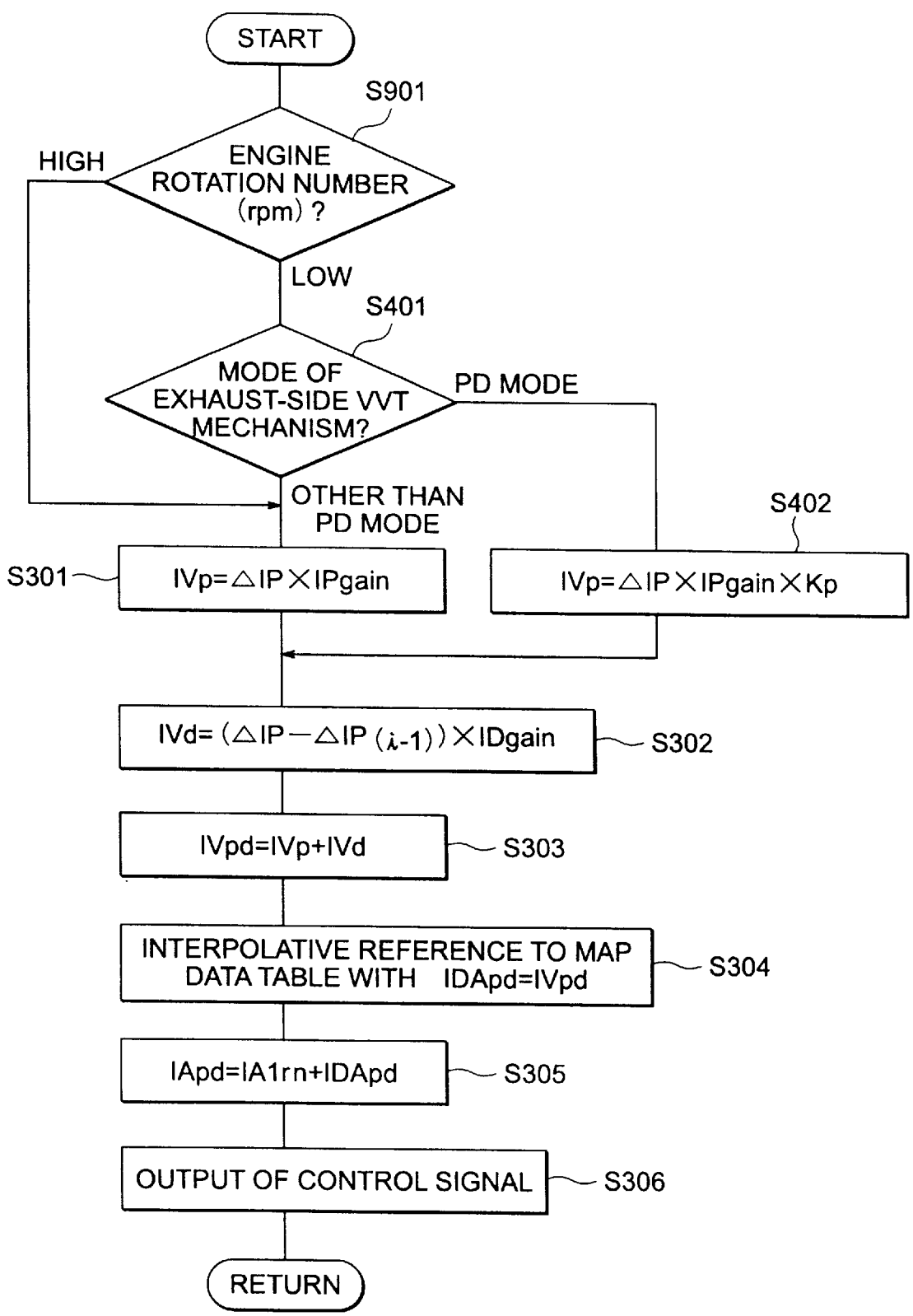
FIG. 9 is a flow chart for illustrating a control procedure executed by the variable valve timing system according to a third embodiment of the present invention.

FIG. 9 is a flow chart for illustrating the control procedure of the intake-side variable valve timing (VVT) mechanism according to the third embodiment of the present invention. This control procedure is executed when decision has been made through the control mode decision processing that the proportional-plus-derivative control mode is being effectuated. Differing from the processing procedure illustrated in FIG. 3, the control processing for the correction is executed only when the engine is actually in the state which requires the correction.

In the first place, decision is made in a step S901 as to whether the engine rotation number (or engine speed) in rpm is higher than a predetermined value inclusive. In this conjunction, with the phrase "predetermined value", it is contemplated to mean the engine rotation number (or engine speed) at which an adequate oil or hydraulic pressure can be ensured such as, for example, 2000 rpm or higher. In the case where the engine rotation number (or engine speed) is not lower the predetermined value, it is then decided that the oil or hydraulic pressure is sufficient and that the intake-side variable valve timing mechanism and the exhaust-side variable valve timing mechanism can be actuated simultaneously without incurring degradation in the responsivity. Thus, the processing proceeds to the S301 where no correction is performed for the proportional value.

On the other hand, when it is decided in the step S901 that the engine rotation number (or engine speed) is lower than the predetermined value, it is then determined that the responsivity will become lowered or degraded when both the intake-side variable valve timing (VVT) mechanism and exhaust-side variable valve timing (VTT) mechanism are actuated simultaneously. In this case, the processing proceeds to a step S401. When it is found that the exhaust-side variable valve timing mechanism is in the proportional-plus-derivative (PD) control mode, then the processing proceeds to the step S402 where the correction is performed for the proportional value described hereinbefore in conjunction with the first embodiment of the present invention.

Figure 10:
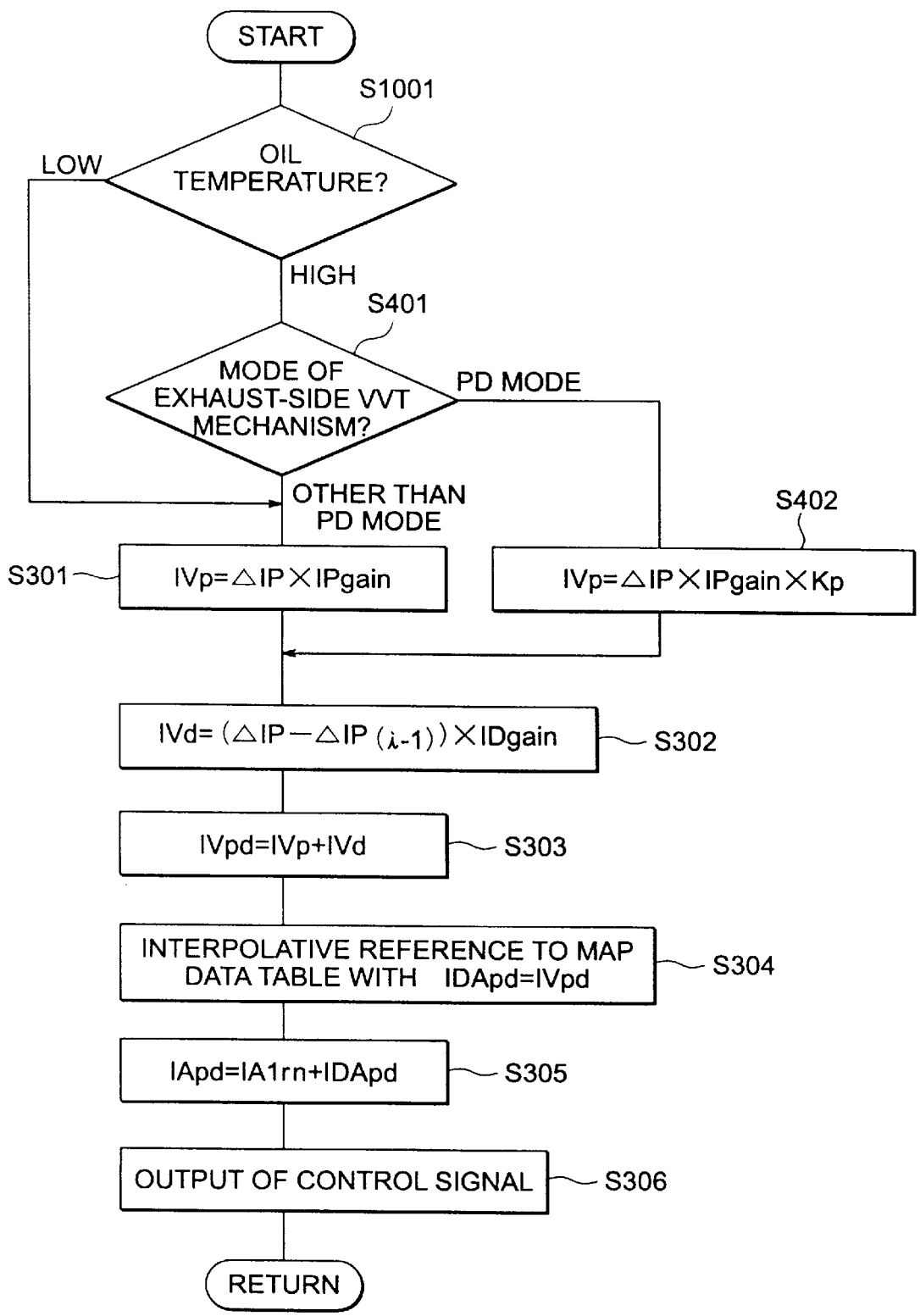
FIG. 10 is a flow chart for illustrating a modified control procedure executed by the valve timing control system according to the third embodiment of the invention.

FIG. 10 is a flow chart for illustrating another or modified processing procedure according to the third embodiment of the present invention. It is presumed that the viscosity of the engine lubricating oil and hence the oil or hydraulic pressure become lowered due to temperature rise of the lubricating oil. Consequently, the control responsivity becomes lowered or degraded correspondingly. The correction processing illustrated in FIG. 10 is not performed at a low oil temperature but carried out only when the oil temperature is high.

Referring to FIG. 10, in a step S1001, decision is made as to whether or not the oil temperature of the engine lubricating oil is higher than the predetermined value inclusive. In this conjunction, the oil temperature higher than the predetermined value inclusive can be estimated by making decision as to whether or not the engine has been operated continuously at a high speed (rpm), under heavy load and at a low vehicle speed. By way of example, the oil temperature higher than the predetermined value inclusive may be determined when the engine has been operated continuously for three minutes or more at an engine rotation number (or engine speed) not lower than 4000 rpm, with the fuel-mixture charging efficiency not lower than 50% and at a vehicle speed of lower than 40 km/h inclusive. When it is estimated in the step S1001 that the engine lubricating oil is not high and that the conditions mentioned above are not satisfied, the processing proceeds to the step S301 where the arithmetic determination of the proportional value is performed without carrying out any correction. By contrast, when it is determined through estimation in the step S1001 that the engine lubricating oil is at a high temperature with the conditions enumerated above being met, then the processing proceeds to the step S401 where decision is made as to whether or not the exhaust-side variable valve timing (VVT) mechanism is being actuated in the proportional-plus-derivative control mode (PD mode). If the above decision (step S401) results in affirmation "PD mode", the processing proceeds then to the step S402 where the proportional value arithmetic is performed, being accompanied with the correction processing, as elucidated hereinbefore in conjunction with the first embodiment of the invention.

Figure 11:
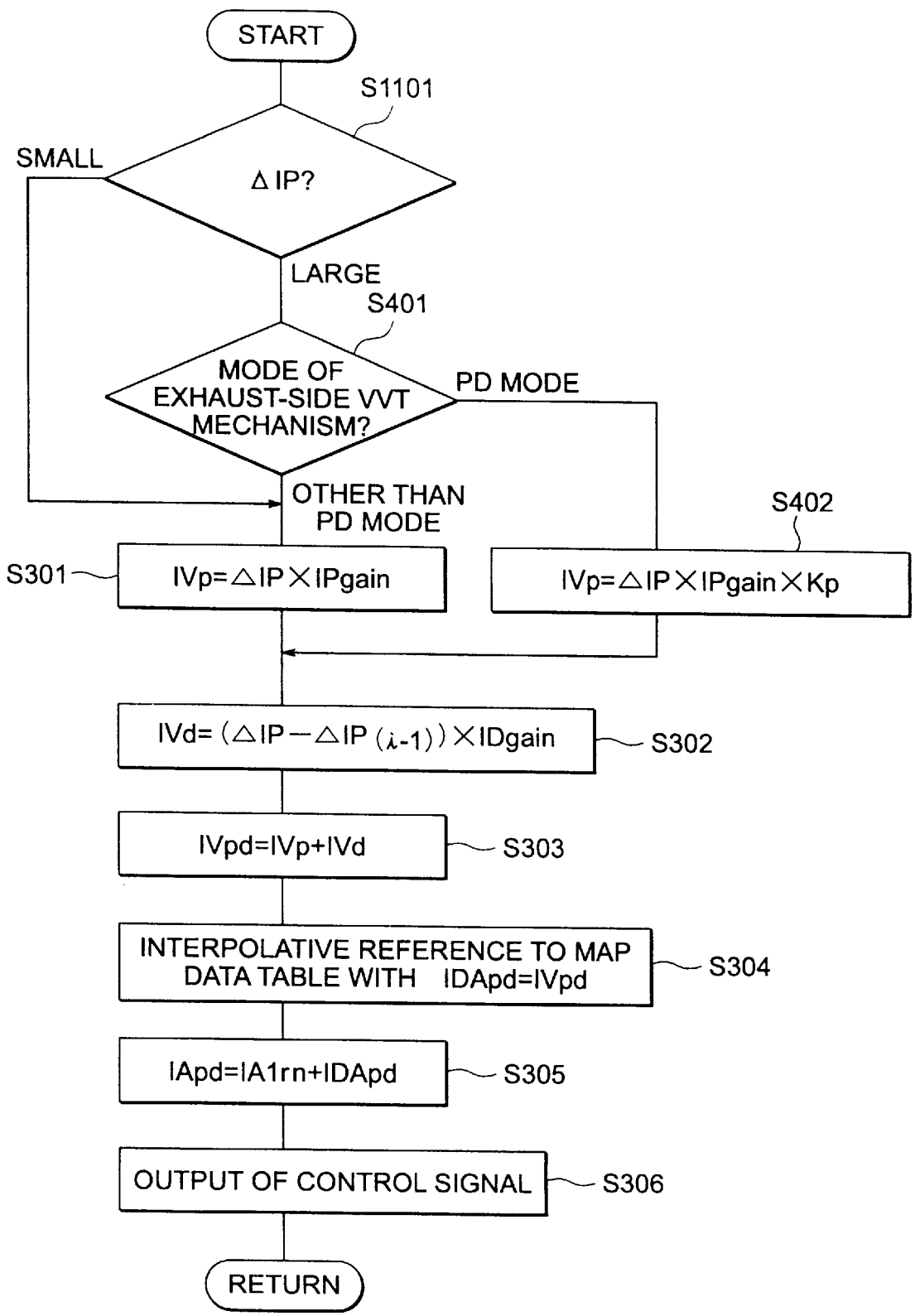
FIG. 11 is a flow chart for illustrating another modified control procedure executed by the valve timing control system according to the third embodiment of the present invention.

FIG. 11 is a flow chart for illustrating another or modified processing procedure according to the third embodiment of the present invention. At this juncture, it should be recalled that when the difference or deviation between the detected advance quantity and the target advance quantity is large, an increased amount of oil is supplied to the variable valve timing (VVT) actuator(s) to thereby perform the control for causing the detected advance quantity to follow speedily the target advance quantity, which results in that degradation is incurred in the control responsivity, which is thus to be corrected. However, in case the difference or deviation between the detected advance quantity and the target advance quantity is small, oil supply to the variable valve timing (VVT) actuator is carried out only slowly, which means that lowering of the oil or hydraulic pressures is insignificant, requiring no correction. Thus, in the processing procedure illustrated in FIG. 11, decision is made on the basis of magnitude of the difference or deviation of the detected advance quantity from the target advance quantity as to whether or not the correction is to be effectuated. In other words, selection as to whether the correction is to be performed or not is made in dependence on magnitude of the difference or deviation of the detected advance quantity from the target advance quantity, whereby controllability (or control performance) can be enhanced.

Referring to FIG. 11, in a step S1101, it is decided whether the difference or deviation ($\Delta$IP) between the detected advance quantity IPd and the target advance quantity IPt is greater than a predetermined value inclusive. With the phrase "predetermined value" used hereat, it is contemplated to mean a value of the difference or deviation at which the oil or hydraulic pressure lowers significantly upon actuation of the variable valve timing (VVT) actuator. By way of example, the predetermined value may be set to be at least 20 degCA (i.e., 20 degrees in terms of crank angle). When it is decided in the step S1101 that the difference or deviation ($\Delta$IP) is small, the processing proceeds to the step S301 where the proportional value arithmetic is carried out without being accompanied with any correction. On the contrary, when the decision in the step S1101 results in affirmation, i.e., the difference or deviation ($\Delta$IP) is large, the processing proceeds to the step S401 where decision is made as to whether or not the exhaust-side variable valve timing (VVT) mechanism is in the proportional-plus-derivative control mode (PD mode). In case the decision step S401 results in affirmation "PD mode", the processing proceeds to the step S402 where the proportional value arithmetic is carried out, being accompanied with the correction processing, as described hereinbefore.

Figure 12:
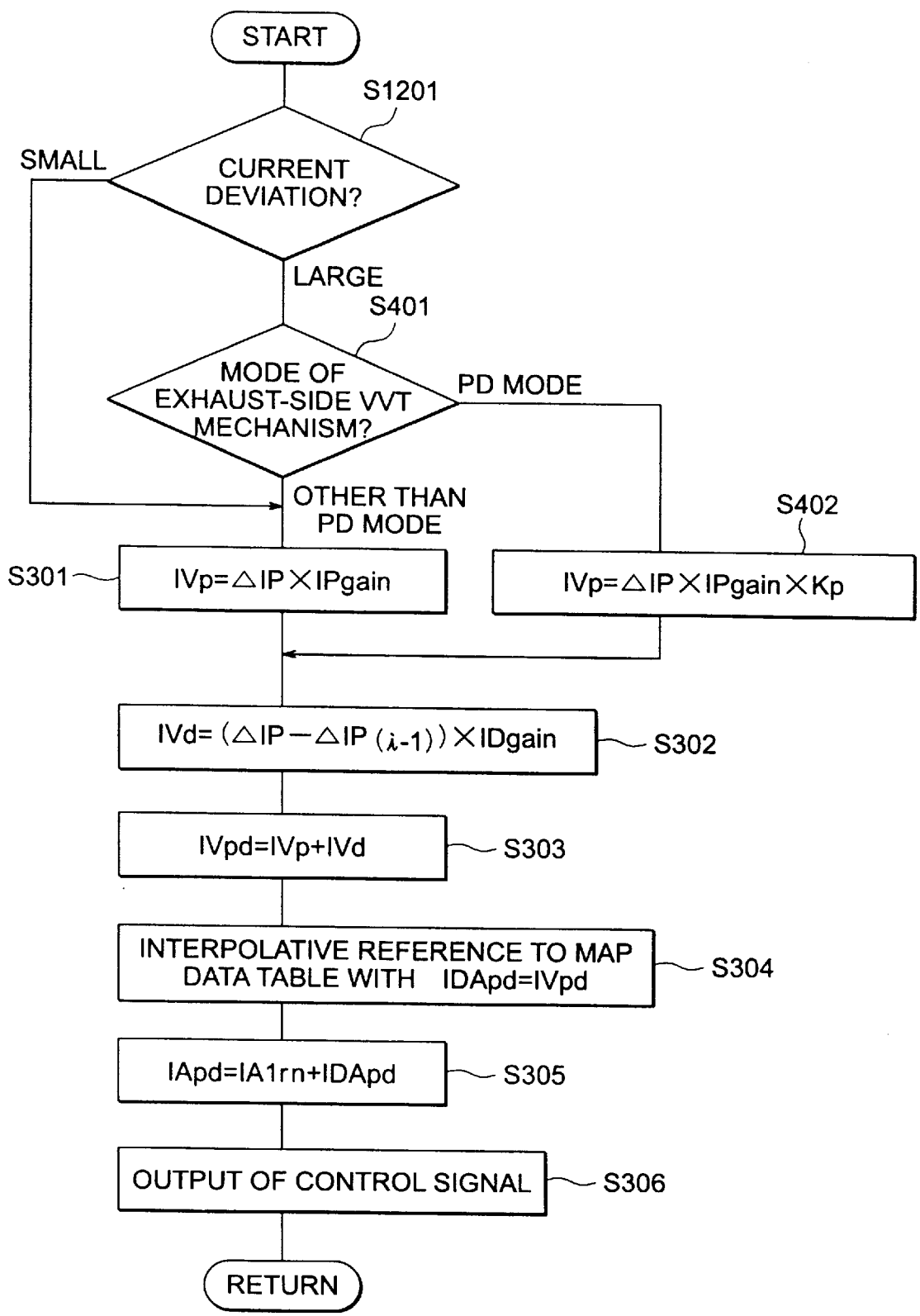
FIG. 12 is a flow chart for illustrating yet another control procedure executed by the valve timing control system according to the third embodiment of the present invention.

Advantageous effect equivalent to that of the processing procedure illustration in FIG. 11 can be achieved by making decision of the value of the control current (target or detected current) of the oil control valve in place of the difference or deviation of the detected advance quantity from the target advance quantity. FIG. 12 is a flow chart for illustrating the processing procedure in which the control current for the oil control valve is used in place of the difference or deviation of the detected advance quantity from the target advance quantity.

Referring to FIG. 12, in a step S1201, decision is made as to whether or not the difference between the control current value and the learned value of the holding current is greater than a predetermined value inclusive. In this conjunction, FIG. 17 is a view illustrating graphically the flow characteristics of the oil control valve which serves to close a passage extending between a hydraulic pressure chamber acting on the variable valve timing (VVT) actuator in the advancing direction and a hydraulic pressure chamber acting on the variable valve timing (VVT) actuator in the retarding direction at an intermediate current value corresponding to a low flow rate, to thereby perform the control for holding the advanced angular position. In this conjunction, it is noted that the value of the current for the hold state may vary due to dispersions of the characteristic current values among the oil control valves, the engines and others. Accordingly, the control current is performed with reference to learned current value.

As will be appreciated, as the difference or deviation of the detected advance quantity from the target advance quantity is large, values of the control current value and the holding current are increased, to thereby increase correspondingly the amount of oil supplied to the variable valve timing (VVT) actuator for speeding up the advancing or retarding operation in order to realize the convergence at a high rate. To say in another way, larger current difference or deviation will incur more remarkable lowering of the oil or hydraulic pressure.

With the predetermined value serving as the reference value upon decision of the difference or deviation between the learned value of the holding current and the control current value in the step S1201, it is contemplated to mean a value of the difference or deviation at which the oil or hydraulic pressure lowers significantly upon actuation of the variable valve timing (VVT) actuator. By way of example, the predetermined value may be set to be at least 200 mA. When it is decided in the step S1201 that the current difference or deviation is small, the processing proceeds to the step S301 where the proportional value arithmetic is carried out without being accompanied with any correction. On the contrary, when the decision in the step S1201 results in affirmation, i.e., the current difference or deviation is large, the processing proceeds to the step S401 where decision is made as to whether or not the exhaust-side variable valve timing (VVT) mechanism is in the proportional-plus-derivative control mode (PD mode). In case the decision step S401 results in affirmation "PD mode", the processing proceeds to the step S402 where the proportional value arithmetic is carried out, being accompanied with the correction processing, as described hereinbefore.

In the forgoing descriptions made by reference to FIGS. 9 to 12, the proportional value which is to replace the one described in conjunction with the processing illustrated in FIG. 4 is subjected to the correction. It should however be added that the correction of the proportional value described by reference to FIGS. 9 to 12 can equally be adopted in the processing procedures described hereinbefore by reference to FIGS. 5 and 6. More specifically, the processing step S901, S1001, S1101 or S1201 may be inserted in precedence to the step S401 for deciding the mode of the exhaust-side variable valve timing mechanism, substantially to the same advantageous effect.

As can now be understood, according to the teachings of the present invention incarnated in the third embodiment thereof, accuracy of the position control for the variable valve timing (VVT) system can be enhanced by performing the correction only for the engine operation state in which such correction is required.

Other Embodiments or Modifications

In the description of the valve timing control systems according to the first to third embodiments of the invention, it has been presumed that the correction processing for the intake-side variable valve timing mechanism is executed in consideration of the operating state of the exhaust-side variable valve timing mechanism. It goes however without saying that the similar or equivalent advantageous effects can be obtained by performing the correction for the exhaust-side variable valve timing mechanism in consideration of the operating state of the intake-side variable valve timing mechanism.

Further, in conjunction with the first to third embodiments of the invention, description has been made on the presumption that the control is performed when both the intake-side variable valve timing mechanism and the exhaust-side variable valve timing mechanism are simultaneously actuated. It should however be appreciated that in the case of e.g. a V-engine, controls of separate banks may be adopted only for the intake-side variable valve timing mechanism or only for the exhaust-side variable valve timing mechanism, substantially to the same advantageous effect.

Furthermore, the concept of the present invention can be adopted for two or more variable valve timing controls such for both the intake-side variable valve timing mechanism and the exhaust-side variable valve timing mechanism of the V-engine, substantially to the same effect.

In the valve timing control systems described in conjunction with the first to third embodiments of the invention, description has been made of the variable valve timing (VVT) control which is effectuated under the oil or hydraulic pressure. However, the correction procedure disclosed herein can equally be adopted as the correcting method for compensating for a voltage drop in electric motors which may be employed in place of the hydraulic actuators.

Furthermore, in the valve timing control systems according to the first to third embodiments of the invention, it has been described that the correction of the simultaneous variable valve timing (VVT) control operations for both the intake-side variable valve timing mechanism and the exhaust-side variable valve timing mechanism is carried out by increasing the hydraulic pressure when compared with the correction of the control for either one of the intake-side variable valve timing mechanism or exhaust-side variable valve timing mechanism. However, the concept of the present invention may equally be adopted for correcting the control of either one of the intake-side variable valve timing mechanism or the exhaust-side variable valve timing mechanism by decreasing the hydraulic pressure when compared with the simultaneous variable valve timing (VVT) operation, substantially to be similar advantageous effect.

As is apparent from the foregoing description, by virtue of such arrangement of the valve timing control system according to the present invention that the first valve timing control means and the second valve timing control means are provided for making variable the valve timings for the first and second valves mounted for opening/closing the intake pipe and the exhaust pipe, respectively, both leading to the combustion chamber defined within the cylinder of the internal combustion engine, by controlling the control values for these valves so that the actually advanced positions of the first and second valves coincide with the respective target advance positions, and that the control value for the first valve timing control means is altered or modified in dependence on or in consideration of the control state of the second valve timing control means, the responsivity of the valve timing control system upon actuation of both the valve timing control means can be improved, which in turn ensure enhancement of drivability of the motor vehicle as well as prevention of deterioration (or degradation) of the exhaust gas quality, to a great advantage.

Furthermore, according to the teachings of the present invention disclosed herein, even in the state where the intake-side variable valve timing mechanism (or exhaust-side variable valve timing mechanism) is being held stationarily with the exhaust-side variable valve timing mechanism (or intake-side variable valve timing mechanism) being actuated, there can be realized a stable control without impairing the steady-state stability of the intake-side variable valve timing mechanism (or exhaust-side variable valve timing mechanism) being held stationarily by increasing correctively the hydraulic pressure for the relevant actuator when compared with the state in which the exhaust-side variable valve timing mechanism (or intake-side variable valve timing mechanism) is not being actuated.

Many features and advantages of the present invention are apparent from the detailed description and thus it is intended by the appended claims to cover all such features and advantages of the valve timing control system which fall within the true spirit and scope of the invention. Further, since numerous modifications and combinations will readily occur to those skilled in the art, it is not intended to limit the invention to the exact construction and operation illustrated and described.

By way of example, although the present invention has been described in conjunction with the structures and operations of the valve timing control system, the present invention is never restricted to such hardware configuration. As can readily be understood by those having ordinary knowledge in this technical field, the present invention can be implemented in terms of control methods which can be carried out by resorting to a microcomputer or microprocessor. Thus, not only the control method but also the recording medium storing such control method is also to be interpreted as falling within the purview of the present invention.

Accordingly, all suitable modifications and equivalents may be resorted to, falling within the spirit and scope of the present invention.

What is claimed is:

1. A valve timing control system for an internal combustion engine, comprising:

first and second valve means arranged for opening/closing an intake pipe leading to a combustion chamber of an internal combustion engine and/or an exhaust pipe extending from said combustion chamber;

first valve timing control means designed for causing a valve timing to change so that an actually advanced position of at least either one of said first and second valve means coincides with a target advance position by regulating a control value; and second valve timing control means designed for causing a valve timing to change so that an actually advanced position of the other one of said first and second valve means coincides with a target advance position by regulating a control value;

wherein the control value for said first valve timing control means is changed in dependence on a controlling state of said second valve timing control means for thereby improving responsivity of said valve timing control system upon actuation of said first and second valve timing control means, respectively.

2. A valve timing control system for an internal combustion engine according to claim 1, wherein said first valve timing control means is designed for controlling a timing of an intake valve for actuation thereof, while said second valve timing control means is designed for controlling a timing of an exhaust valve for actuation thereof.

3. A valve timing control system for an internal combustion engine according to claim 1, wherein said first valve timing control means is designed for controlling a timing of an exhaust valve for actuation thereof, while said second valve timing control means is designed for controlling a timing of an intake valve for actuation thereof.

4. A valve timing control system for an internal combustion engine according to claim 1, wherein the control value for said first valve timing control means is corrected in dependence on a control mode of said second valve timing control means.

5. A valve timing control system for an internal combustion engine according to claim 4, wherein said control mode is one selected from a group consisting of a follow mode following said target advance position, a coincidence mode conforming with said target advance position and a forcive control mode for ensuring fail-safe.

6. A valve timing control system for an internal combustion engine according to claim 5, wherein when said first valve timing control means is in said follow mode following said target advance position, a correcting value for said control value is changed in dependence on the control mode of said second valve timing control means.

7. A valve timing control system for an internal combustion engine according to claim 6, wherein said correcting value for said first valve timing control means is changed in dependence on whether the control mode of said second valve timing control means is in said follow mode following said target position or in the other control mode.

8. A valve timing control system for an internal combustion engine according to claim 6, wherein said correcting value for said first valve timing control means is selected to be greater in the state in which said second valve timing control means is in said follow mode following said target advance position rather than when said second valve timing control means is in said other control mode.

9. A valve timing control system for an internal combustion engine according to claim 6, wherein in said follow mode for following said target advance position, a proportional-plus-derivative control (PD control) is carried out, and wherein the correcting value to be changed is a correcting value for a proportional value in said proportional-plus-derivative control (PD control).

10. A valve timing control system for an internal combustion engine according to claim 6, wherein in said follow mode for following said target advance position, a proportional-plus-derivative control (PD control) is carried out, and wherein a correcting value to be changed includes a correcting value for a proportional value and a correcting value for a differential (derivative) value, respectively.

11. A valve timing control system for an internal combustion engine according to claim 6, wherein in said follow mode for following said target advance position, a proportional-plus-derivative control (PD control) is carried out, and wherein a correcting value to be changed is a correcting value for a control value which is determined on the basis of a proportional value and a differential value of said proportional-plus-derivative control by taking into account characteristics of hydraulic pressure (oil pressure) control valves.

12. A valve timing control system for an internal combustion engine according to claim 5, wherein when said first valve timing control means is in said coincidence mode conforming with said target advance position, a correcting value for said control value is changed in dependence on the control mode of said second valve timing control means.

13. A valve timing control system for an internal combustion engine according to claim 12, wherein said correcting value for said first valve timing control means is changed in dependence on whether the control mode of said second valve timing control means is in said follow mode following said target position or in the other control mode.

14. A valve timing control system for an internal combustion engine according to claim 12, wherein in said coincidence mode conforming with said target advance position, an integral control is carried out, and wherein a correcting value to be changed is a correcting value for an integrated value in said integral control.

15. A valve timing control system for an internal combustion engine according to claim 1, wherein change of the valve timing control value for said first valve timing control means in dependence on a valve timing control state of said second valve timing control means is validated only in a state in which oil pressure prevailing in said internal combustion engine is low.

16. A valve timing control system for an internal combustion engine according to claim 15, wherein said state in which the oil pressure prevailing in said internal combustion engine is low is indicated by a state in which rotation number (rpm) of said internal combustion engine is relatively low.

17. A valve timing control system for an internal combustion engine according to claim 15, wherein said state in which the oil pressure prevailing in said internal combustion engine is low is indicated by a state in which temperature of a lubricating oil for said internal combustion engine is relatively high.

18. A valve timing control system for an internal combustion engine according to claim 15, wherein said state in which the oil pressure prevailing in said internal combustion engine is low is indicated by a state in which magnitude of actuation of said second valve timing control means is large.

19. A valve timing control system for an internal combustion engine according to claim 18, wherein said state in which magnitude of actuation of said second valve timing control means is large is indicated by a state in which deviation of the actually advanced position from the target advance position is large.

20. A valve timing control system for an internal combustion engine according to claim 18, wherein said state in which magnitude of actuation of said second valve timing control means is large is indicated by a state in which deviation of the control quantity is large when compared with that in the coincidence mode conforming with said target advance position.

* * * * *